(12) United States Patent
Carter et al.

(10) Patent No.: US 10,812,150 B2
(45) Date of Patent: Oct. 20, 2020

(54) FIRST PORTABLE ELECTRONIC DEVICE FOR FACILITATING A PROXIMITY BASED INTERACTION WITH A SECOND PORTABLE ELECTRONIC DEVICE

(71) Applicant: International Forte Group LLC, Westport, CT (US)

(72) Inventors: Patrick L Carter, Lone tree, CO (US); Laura M Rangel, Rancho Palos Verdes, CA (US); Julie E Sternberg, Westport, CT (US)

(73) Assignee: INTERNATIONAL FORTE GROUP LLC, Westport, CT (US)

( * ) Notice: Subject to any disclaimer, the term of this patent is extended or adjusted under 35 U.S.C. 154(b) by 0 days.

(21) Appl. No.: 16/544,827

(22) Filed: Aug. 19, 2019

(65) Prior Publication Data

US 2020/0059754 A1 Feb. 20, 2020

Related U.S. Application Data

(60) Provisional application No. 62/719,682, filed on Aug. 19, 2018, provisional application No. 62/719,683, (Continued)

(51) Int. Cl.
*H04B 5/02* (2006.01)
*H04B 5/00* (2006.01)
(Continued)

(52) U.S. Cl.
CPC ............ *H04B 5/02* (2013.01); *H04B 5/0043* (2013.01); *H04B 7/02* (2013.01); *H04B 7/022* (2013.01); *H04B 7/028* (2013.01); *H04B 7/04* (2013.01); *H04B 7/0404* (2013.01); *H04B 7/0413* (2013.01); *H04B 7/0619* (2013.01); *H04B 7/10* (2013.01); *H04B 7/12* (2013.01); *H04B 7/22* (2013.01); *H04W 4/027* (2013.01); *H04W 4/38* (2018.02); *H04W 4/80* (2018.02); *H04W 16/18* (2013.01); *H04W 16/22* (2013.01);
(Continued)

(58) Field of Classification Search
CPC ..... G06F 1/163; G06F 3/016; G06K 9/00355; H04W 4/027; H04W 4/38; H04W 4/80; H04B 5/0043; H04L 67/306
See application file for complete search history.

(56) References Cited

U.S. PATENT DOCUMENTS

2019/0101991 A1* 4/2019 Brennan ................. G06T 7/248

* cited by examiner

Primary Examiner — Fred A Casca
(74) Attorney, Agent, or Firm — Patent Yogi LLC; Dhiraj Jindal

(57) ABSTRACT

Disclosed herein is a first portable electronic device for facilitating a proximity based interaction with at least one second portable electronic device. The first portable electronic device may include at least one first sensor device configured to generate at least one first sensor data, a first transceiver configured for communicating with at least one second transceiver associated with the at least one second portable electronic device, a first processor configured for detecting at least one proximity based event based on the at least one first sensor data from the at least one first sensor device, and generating a combined digital asset using a first digital asset and at least one second digital asset based on the detecting, and a memory device configured for storing the combined digital asset and the first digital asset.

14 Claims, 16 Drawing Sheets

Related U.S. Application Data filed on Aug. 19, 2018, provisional application No. 62/784,974, filed on Dec. 26, 2018, provisional application No. 62/784,985, filed on Dec. 26, 2018.

(51) Int. Cl.
*H04W 4/38* (2018.01)
*H04W 4/80* (2018.01)
*H04W 4/02* (2018.01)
*H04B 7/02* (2018.01)
*H04B 7/0413* (2017.01)
*H04B 7/022* (2017.01)
*H04B 7/0404* (2017.01)
*H04B 7/06* (2006.01)
*H04B 7/04* (2017.01)
*H04B 7/22* (2006.01)
*H04B 7/10* (2017.01)
*H04B 7/12* (2006.01)
*H04W 16/18* (2009.01)
*H04W 16/22* (2009.01)
*H04W 16/26* (2009.01)
*H04W 16/24* (2009.01)
*H04W 16/32* (2009.01)
*H04W 16/28* (2009.01)

(52) U.S. Cl.
CPC ........... *H04W 16/24* (2013.01); *H04W 16/26* (2013.01); *H04W 16/32* (2013.01); *H04B 7/0628* (2013.01); *H04W 16/28* (2013.01)

FIRST PORTABLE ELECTRONIC DEVICE FOR FACILITATING A PROXIMITY BASED INTERACTION WITH A SECOND PORTABLE ELECTRONIC DEVICE

RELATED APPLICATIONS

The present application claims priority to, and is a non-provisional application of Provisional Application No. 62/719,682 entitled: Close-Proximity Social Interaction and Creative Expression filed on Aug. 19, 2018; Application No. 62/719,683 entitled: Virtual Social Mesh Network filed on Aug. 19, 2018; Application No. 62/784,974 entitled: Method and System for Digital Un Boxing and Management of Digital Content and Collectibles filed on Dec. 26, 2018; and Application No. 62/784,985 entitled: Method and System for Creating Ad-Hoc Shared Virtual Experiences filed on Aug. 26, 2018, the disclosures of which are hereby incorporated by reference in their entirety herein and below.

Further, the present application is related to the following non-provisional applications entitled:
1. PORTABLE ELECTRONIC DEVICE FOR FACILITATING A PROXIMITY BASED INTERACTION WITH A SHORT RANGE COMMUNICATION ENABLED OBJECT filed on Aug. 19, 2019;
2. A FIRST PORTABLE ELECTRONIC DEVICE FOR FACILITATING A PROXIMITY BASED INTERACTION WITH A SECOND PORTABLE ELECTRONIC DEVICE BASED ON A PLURALITY OF GESTURES filed on Aug. 19, 2019; and
3. SHORT RANGE COMMUNICATION ENABLED OBJECT FOR FACILITATING PROXIMITY BASED INTERACTION WITH AT LEAST ONE ELECTRONIC DEVICE filed on Aug. 19, 2019.

TECHNICAL FIELD

Generally, the present disclosure relates to the field of data processing. More specifically, the present disclosure relates to a first portable electronic device for facilitating a proximity based interaction with a second portable electronic device.

BACKGROUND

Near-field communication (NFC) is a set of communication protocols that enable two electronic devices, that are close to each other (for e.g. within 4 cm), to establish communication with each other. The two electronic devices (such as smartphones) under close proximity can share contacts, photos, videos or files using the NFC. Further, NFC is also used for facilitating making payments using mobile devices through NFC enabled POS devices.

However, mobile devices communicating over NFC channels are unable to create content that may be based on existing content stored on the mobile devices. Further, mobile devices communicating over NFC channels are unable to modify digital content associated with each other.

Further, short range communication enabled devices, such as NFC enabled scanning devices are not capable of dynamically changing how they are presented to other devices. Further, NFC enabled scanning devices are not able to modify a manner in which the NFC enabled scanning devices are read by other NFC enabled devices as part of closed systems of advanced interactions.

Therefore, there is a need for improved first portable electronic device for facilitating a proximity based interaction with a second portable electronic device that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a first portable electronic device facilitating a proximity based interaction with at least one second portable electronic device, in accordance with some embodiments. Accordingly, the first portable electronic device may include at least one first sensor device configured to generate at least one first sensor data. Further, the first portable electronic device may include a first transceiver configured for communicating with at least one second transceiver associated with the at least one second portable electronic device. Further, the first portable electronic device may include a first processor communicatively coupled with each of the first transceiver and the at least one first sensor device. Further, the first processor may be configured for detecting at least one proximity based event based on the at least one first sensor data from the at least one first sensor device. Further, the first processor may be configured for generating a combined digital asset using a first digital asset and at least one second digital asset based on the detecting. Further, the first digital asset may be obtained from a memory device associated with the first portable electronic device. Further, the at least one second digital asset may be obtained from the at least one second portable electronic device. Further, the first portable electronic device may include the memory device configured for storing the combined digital asset and the first digital asset.

Further disclosed herein is a first portable electronic device facilitating a proximity based interaction with at least one second portable electronic device, in accordance with some embodiments. Accordingly, the first portable electronic device may include at least one first sensor device configured to generate at least one first sensor data. Further, the first portable electronic device may include a first transceiver configured for communicating with at least one second transceiver associated with the at least one second portable electronic device. Further, the first portable electronic device may include a first processor communicatively coupled with each of the first transceiver and the at least one first sensor device. Further, the first processor may be configured for detecting at least one proximity based event based on the at least one first sensor data from the at least one first sensor device. Further, the first processor may be configured for generating a combined digital asset using a first digital asset and at least one second digital asset based on the detecting. Further, the first digital asset may be obtained from a memory device associated with the first portable electronic device. Further, the at least one second digital asset may be obtained from the at least one second portable electronic device. Further, the first portable electronic device may include a presentation device communicatively coupled with the first processor. Further, the presentation device may be configured to present the combined digital asset. Further, the first portable electronic device may include the memory device configured for storing the combined digital asset and the first digital asset.

Further disclosed herein is a first portable electronic device facilitating a proximity based interaction with at least one second portable electronic device. Further, the first portable electronic device may include at least one first sensor device configured to generate at least one of a first sensor data, at least one second sensor data, and a third sensor data. Further, the first portable electronic device may include a first transceiver configured for communicating with at least one second transceiver associated with the at least one second portable electronic device. Further, the first portable electronic device may include a first processor communicatively coupled with each of the first transceiver and the at least one first sensor device. Further, the first processor may be configured for detecting a pre-tap gesture based on the first sensor data. Further, the first processor may be configured for entering the first portable electronic device in an interaction mode based on the detecting of the pre-tap gesture. Further, the first processor may be configured for detecting at least one proximity based event using the at least one second sensor data based on the interaction mode. Further, the first processor may be configured for generating a combined digital asset using a first digital asset and at least one second digital asset based on the detecting of the at least one proximity based event. Further, the first digital asset may be obtained from a memory device associated with the first portable electronic device. Further, the at least one second digital asset may be obtained from the at least one second portable electronic device. Further, the first processor may be configured for detecting a post-tap gesture based on the third sensor data. Further, the first processor may be configured for performing one of an acceptance and a rejection of the combined digital asset based on the post-tap gesture. Further, the first portable electronic device may include a presentation device communicatively coupled with the first processor. Further, the presentation device may be configured to present the combined digital asset. Further, the presentation device may include at least one of a display device, an audio device, and a haptic feedback device. Further, the first portable electronic device may include the memory device configured for storing the combined digital asset based on the post-tap gesture.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
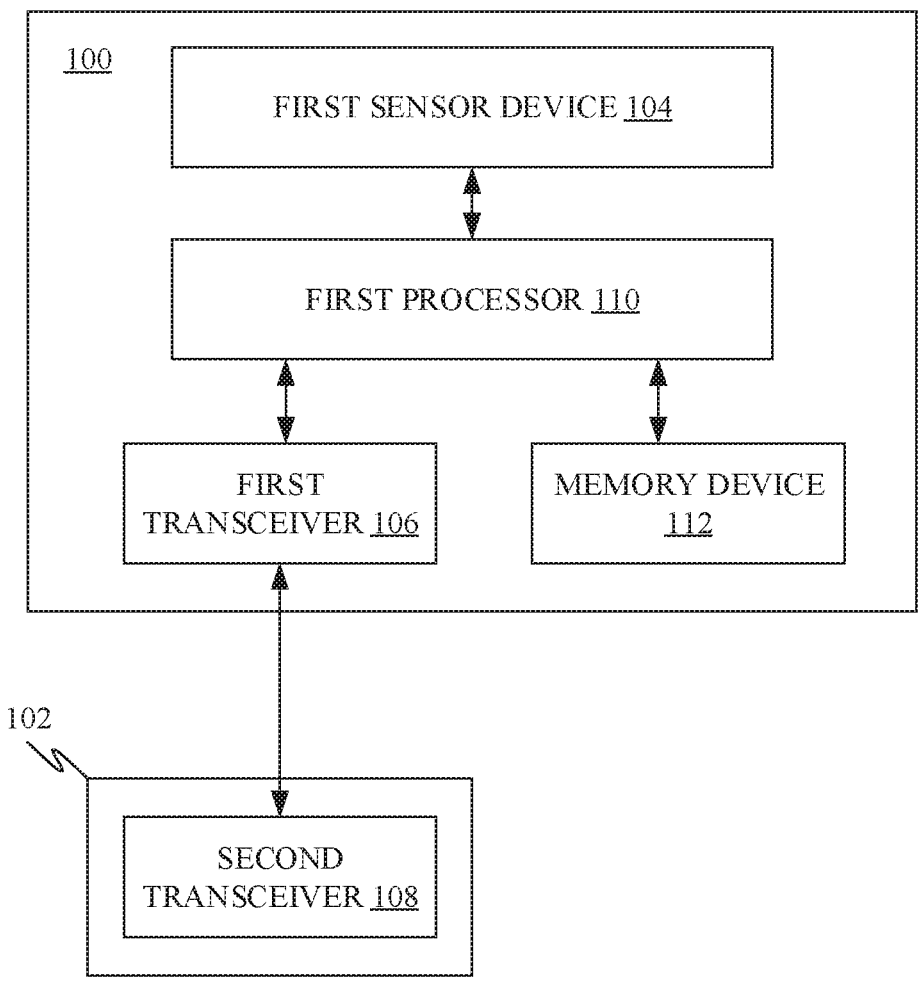
FIG. 1 is a block diagram representation of a first portable electronic device for facilitating a proximity based interaction with a second portable electronic device, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a first portable electronic device for facilitating a proximity based interaction with a second portable electronic device, embodiments of the present disclosure are not limited to use only in this context.

In general, the methods disclosed herein may be performed by one or more computing devices. For example, in some embodiments, the methods may be performed by a server computer in communication with one or more client devices over a communication network such as, for example, the Internet. In some other embodiments, the methods may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the methods disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the methods may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the methods may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the methods. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the methods may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the methods. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the methods. Accordingly, the one or more predefined conditions may be generated, using the processing device, based on the correlation.

Further, one or more steps of the methods may be performed at one or more spatial locations. For instance, the methods may be performed by a plurality of devices interconnected through a communication network. Accordingly, in an example, one or more steps of the methods may be performed by a server computer. Similarly, one or more steps of the methods may be performed by a client computer. Likewise, one or more steps of the methods may be performed by an intermediate entity such as, for example, a proxy server. For instance, one or more steps of the methods may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the methods. For example, in a client-server environment, sensitive data corresponding to a user may not be allowed to be transmitted to the server computer. Accordingly, one or more steps of the methods operating on the sensitive data and/or a derivative thereof may be performed at the client device.

FIG. 1 is a block diagram representation of a first portable electronic device 100 facilitating a proximity based interaction with at least one second portable electronic device 102, in accordance with some embodiments. Further, the proximity based interaction, in an instance, may be near field communication (such as transfer of a digital asset) between the first portable electronic device 100 and the at least one second portable electronic device 102. Further, the digital asset, in an instance, may include any digital data such as (but not limited to) a textual content, Patterns, a visual content, an audio content, an audiovisual content, and so on. In some embodiments, at least one of the first portable electronic device 100 and the at least one second portable electronic device 102 may be a wearable electronic device. For instance, the wearable electronic device may include, but not limited to, wristbands, wristwatches (e.g. Apple® watch), smart glasses (e.g. Google Glasses®), E-textiles (e.g. Levi's® commuter trucker Jacket), an NFC enabled ring, and so on. In some embodiments, at least one of the first portable electronic device 100 and the at least one second portable electronic device 102 may be a short range communication enabled object. Further, the short range communication enabled object may include an electronic device configured to communicate over a communication channel, when in close proximity. Further, the short range communication enabled object may be configured to transmit, and receive short range communication signals from short range communication enabled devices over the communication channel, such as NFC, or BLE. Further, in an embodiment, short range communication may include communication protocols enabling a plurality of devices (such as first the portable electronic device 100, and second portable electronic device 102) to establish mutual communication. For instance, short range communication may allow the plurality of devices to establish mutual communication over Bluetooth network, a Bluetooth Low Energy (BLE) network, a Near Field Communication (NFC) network, and so on. In some embodiments, the short range communication enabled object may include at least one of an NFC enabled trading card, an NFC enabled poster, and an NFC enabled product packaging. Further, the NFC enabled trading card, in an instance, may include an electronic card that may be tapped with other portable electronic devices in different combinations to create digital patterns (and/or digital art). Further, the NFC enabled trading card, in an instance, may be embedded with one or more NFC tags and related data payloads. Further, the NFC enabled trading card may be described in conjunction with FIG. 6.

Accordingly, the first portable electronic device 100 may include at least one first sensor device 104 configured to generate at least one first sensor data. In some embodiments, the at least one first sensor device 104 may include at least one of a radio frequency sensor, an image sensor, a proximity sensor, an audio sensor, a motion sensor, and an accelerometer. For instance, the at least one first sensor data may include signals (such as NFC signals) sensed by the at least one first sensor device 104 (such as the radio frequency sensor) that may be used to detect a presence of another portable electronic device (e.g. another NFC based electronic device) in near vicinity.

Further, the first portable electronic device 100 may include a first transceiver 106 configured for communicating with at least one second transceiver 108 associated with the at least one second portable electronic device 102.

Further, the first portable electronic device 100 may include a first processor 110 communicatively coupled with each of the first transceiver 106 and the at least one first sensor device 104. Further, the first processor 110 may be configured for detecting at least one proximity based event based on the at least one first sensor data from the at least one first sensor device 104. Further, in some embodiments, the at least one proximity based event may include at least one of identifying a contact between the first portable electronic device 100 and the at least one second portable electronic device 102, detecting distance between the first portable electronic device 100 and the at least one second portable electronic device 102 to be within a pre-defined range, and a capturing at least one visual code associated with the at least one second portable electronic device 102 using an image sensor of the first portable electronic device 100. For instance, the at least one proximity based event may be detected when the first portable electronic device 100 may make a physical contact with the at least one second portable electronic device 102 (such as touching and/or tapping of the first portable electronic device 100 with the at least one second portable electronic device 102). Further, in another instance, the at least one proximity based event may be detected when the first portable electronic device 100 may be placed close (without making a physical contact) to the at least one second portable electronic device 102 (for e.g. when a separation between the first portable electronic device 100 and the at least one second portable electronic device 102 may be in the predefined range, say 3-20 centimeters). Further, in another instance, the at least one proximity based event may be detected when the first portable electronic device 100 may scan/capture (using the at least one sensor device, such as the image sensor) the at least one visual code (such as, but not limited to, a QR code, a bar code etc.) associated with the at least one second portable electronic device 102.

Further, the first processor 110 may be configured for generating a combined digital asset using a first digital asset and at least one second digital asset based on the detecting of the at least one proximity based event. Further, the first digital asset may be obtained from a memory device 112 associated with the first portable electronic device 100. Further, the at least one second digital asset may be obtained from the at least one second portable electronic device 102. Further, the combined digital asset, in an instance, may be a new digital asset that may be formed by inheriting one or more characteristics associated with each of the first digital asset and the at least one second digital asset. For instance, the combined digital asset may include a digital art that may include visual features (such as colors) inherited from a first digital asset and may include physical features (such as size and/or dimensions) inherited from a second digital asset. For instance, if the first digital asset may include a digital art of a fictional character (such as a Pokémon character Pikachu©) and the at least one second digital asset may include a digital pattern of pink color, then the combined digital asset may include a digital art such as (but not limited to) a pink colored Pikachu©.

In some embodiments, the first digital asset may include one or more first user attributes associated with the first user. In the general, the one or more first user attributes may include any characteristic associated with the first user. For instance, the one or more first user attributes may include a first user interest. In another instance, the one or more first user attributes may include a unique identifier associated with the first user, a name of the first user, a demographic variable of the first user and so on. Likewise, the second digital asset may include one or more second user attributes associated with the second user. In the general, the one or more second user attributes may include any characteristic associated with the second user. For instance, the one or more second user attributes may include a second user interest. In another instance, the one or more second user attributes may include a unique identifier associated with the second user, a name of the second user, a demographic variable of the second user and so on. Further, in some embodiments, at least one of the one or more first user attributes and the one or more second user attributes may be configurable by one or more of the first user and the second user.

Further, in some embodiments, the first transceiver 106 may be configured to transmit a short range communication signal to the second portable electronic device 102, and receive a received short range communication signal from the second portable electronic device 102 over an NFC communication channel. Further, the first processor 110 may be configured for detecting the proximity based event based on receiving the received short range communication signal from the second portable electronic device 102. Further, the first processor 110 may be configured for performing the predetermined event based on the detecting. Further, the proximity based event may include transmitting the first digital asset to the second portable electronic device 102, including at least one of a pattern, an image, a looped animation, a colored pattern including a coloration action on the pattern, a moving pattern including a movement action on the pattern, and a pattern comprising one or more effects. Further, the transmitting the first digital asset to the second portable electronic device 102 may be performed over a communication network including, but not limited to Bluetooth, Wi-Fi, and BLE.

Further, in some embodiments, the combined digital asset may be created through encoding and decoding. Further, in an instance, WEBP encoding (as stored in the memory device 112, and the second portable electronic device 102) may be configured to radically compress image/media size associated with the first digital asset, and the second digital asset, speeding up processing and enabling some 1-4 image collections to fit within an NDEF payload of NFC tags associated with at least one of the first digital asset, and the second digital asset with 1-2K of memory.

In some embodiments, the first digital asset may include at least one of at least one first visual characteristic, at least one first audio characteristic, and at least one first haptic characteristic. Further, the at least one first visual characteristic, in an instance, may be any physical feature associated with the first digital asset, which may reflect visible variables of the first digital asset. For instance, the at least one first visual characteristic may include features such as, but not limited to, color, shape, size, type etc. associated with the first digital asset. Further, the at least one first audio characteristic, in an instance, may be any acoustic feature associated with the first digital asset, which may reflect audible variables of the first digital asset. For instance, the at least one first audio characteristic may include features such as, but not limited to, volume, frequency, tempo rate, type etc. associated with the first digital asset. Further, the at least one first haptic characteristic, in an instance, may be any tactile feature associated with the first digital asset, which may be felt by a user using the first portable electronic device 100. For instance, the at least one first haptic characteristic may include features such as, but not limited to, vibration, temperature etc. associated with the first digital asset. Further, the at least one second digital asset may include at least one of at least one second visual characteristic, at least one second audio characteristic, and at least one second haptic characteristic. Further, the at least one second visual characteristic, in an instance, may be any physical feature associated with the at least one second digital asset, which may reflect visible variables of the at least one second digital asset. For instance, the at least one second visual characteristic may include features such as, but not limited to, color, shape, size, type etc. associated with the at least one second digital asset. Further, the at least one second audio characteristic, in an instance, may be any acoustic feature associated with the at least one second digital asset, which may reflect audible variables of the at least one second digital asset. For instance, the at least one second audio characteristic may include features such as, but not limited to, volume, frequency, tempo rate, type etc. associated with the at least one second digital asset. Further, the at least one second haptic characteristic, in an instance, may be a tactile feature associated with the at least one second digital asset, which may be felt by a user using the at least one second portable electronic device 102. For instance, the at least one second haptic characteristic may include features such as, but not limited to, vibration, temperature etc. associated with the at least one second digital asset.

In some embodiments, the first processor 110 may be configured to generate the combined digital asset by combining at least one of the at least one first visual characteristic, the at least first audio characteristic, and the at least one first haptic characteristic with at least one of the at least one of at least one second visual characteristic, the at least one second audio characteristic, and the at least one second haptic characteristic. For instance, the first processor 110 may combine the at least one first visual characteristic (such as shape and dimensions) of the first digital asset (such as a digital art of a fictional character, e.g. a Pokémon character Pikachu©) with the at least one second visual characteristic (such as color) of the at least one second digital asset (such as a pattern of pink color) in order to generate the combined digital asset, for e.g. a pink colored Pikachu©. Further, in another instance, the first processor 110 may combine the at least one first visual characteristic (such as a shape and dimensions) of the first digital asset (such as a digital art of a fictional character, e.g. a Disney character Aladdin©) with the at least one second audio characteristic (such as an actor's voice, e.g., Brad Pitt's voice) of the at least one second digital asset (such as an audiovisual content, e.g., a Brad Pitt's movie scene) in order to generate the combined digital asset, for e.g. Aladdin© with Brad Pitt's voice. Further, in another instance, the first processor 110 may combine the at least one first visual characteristic (such as font and size) of the first digital asset (such as a text, e.g. a text including a user's name) with the at least one second haptic characteristic (such as a vibration) of the at least one second digital asset (such as a vibrating pattern) in order to generate the combined digital asset, for e.g. a vibration pattern representing the user's name in Morse code.

Further, the first portable electronic device 100 may include the memory device 112 configured for storing the combined digital asset and the first digital asset.

In some embodiments, at least one of the first portable electronic device 100 and the at least one second portable electronic device 102 may include a presentation device configured to present the combined digital asset. Further, the presentation device, in an instance, may be any output device that may be used to present the combined digital asset to the user. In some embodiments, the presentation device may include at least one of a display device, an audio device, and a haptic feedback device. Further, the display device, in an instance, may be configured to present the combined digital asset in a way such that the user may be able to view the combine digital asset. For instance, the display device may include, but not limited to) Light emitting diode (LED), Organic LED, Active-matrix OLED, Liquid crystal display (LCD), 3D display, flexible display, holographic display, and so on. Further, the audio device, in an instance, may be configured to present the combined digital asset in a way such that the user may be able to perceive audible characteristics associated with the combined digital asset. For instance, the audio device may include, but not limited to, a speaker. Further, the haptic feedback device, in an instance, may be configured to present the combined digital asset in a way such that the user may be able to feel any tactile characteristic associated with the combined digital asset. For instance, the haptic feedback device may include, but not limited to, a vibration motor.

Figure 2:
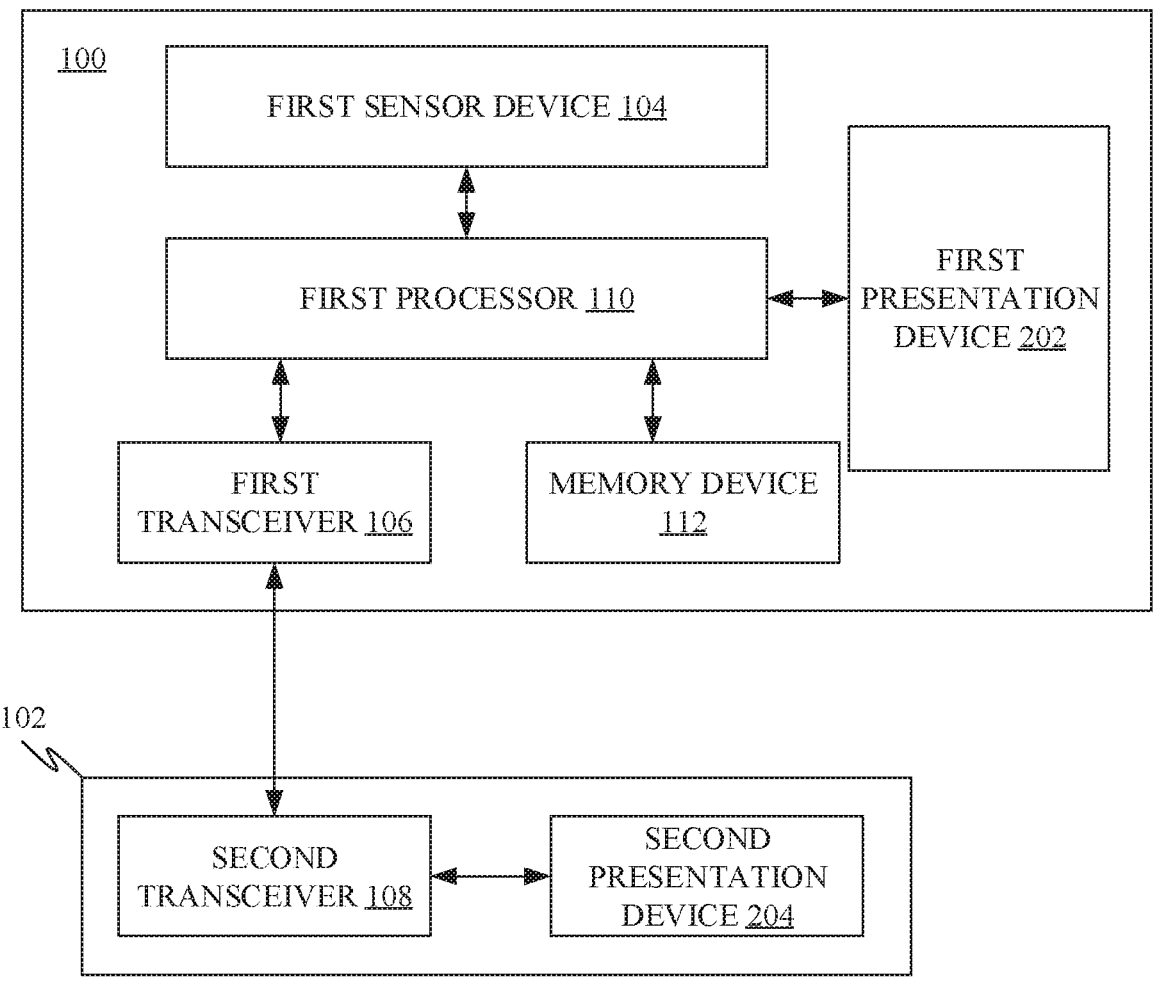
FIG. 2 is a block diagram representation of a first portable electronic device for facilitating a proximity based interaction with a second portable electronic device, in alternate embodiments.

Further, in an alternate embodiment, as shown in FIG. 2, each of the first portable electronic device 100 and the at least one second portable electronic device 102 may include one or more presentation device (such as a first presentation device 202 and a second presentation device 204). Further, the first presentation device 202, in an instance, may be the presentation device that may be embedded within the first portable electronic device 100 and/or may be configured to present the combined digital asset to a user that may be operating the first portable electronic device 100. Further, the second presentation device 204, in an instance, may be the presentation device that may be embedded within the at least one second portable electronic device 102 and/or may be configured to present the combined digital asset to a user that may be operating the at least one second portable electronic device 102.

Further, in some embodiments, the digital asset (such as the first digital asset and/or the at least one second digital asset) may be transmitted, received, and/or exchanged between the first portable electronic device 100 and the at least one second portable electronic device 102 based on a pre-defined protocol (such as, but not limited to, NFC logical link control protocol (LLCP) based on industry standard IEEE 802.2). Further, in some embodiments, the digital asset may include one or more data packets. Each data packet of the one or more data packets, in an instance, may store information associated with the digital asset in a binary form. For instance, the one or more data packets may store information such as, but not limited to, a unique identifier/address associated with an asset transmitting device (e.g. the first portable electronic device 100) that may be transmitting the digital asset to an asset receiving device (e.g. the at least one second portable electronic device 102), a length and/or a size (e.g. in bits) associated with the digital asset, a type of content associated with the digital asset (e.g. if the digital asset may be a pattern, a visual object, a color, an audio, an audiovisual content etc.), and so on. Further, the one or more data packets, in an instance, may include a series of binary digits arranged in a unique manner based on the predefined protocol, which may be decoded by the asset receiving device (e.g. the at least one second portable electronic device 102) in order to retrieve any stored information from the digital asset. For instance, a set of first binary digits (say first 8 bits) may be reserved for the unique address associated with the asset transmitting device, which may allow the asset receiving device to decode from where (and/or from which portable electronic device) the digital asset may be received. Accordingly, next set of binary digits (say a set of next 8 bits), in an instance, may reflect the length and/or the size associated with the digital asset. Further, next set of binary digits, in an instance, may be configured to store relevant message and/or information that may need to be transmitted from the asset transmitted device to the asset receiving device. Further, in some embodiments, the one or more data packets associated with the digital asset may include security codes. Further, the security codes, in an instance, may be error-detecting codes that may be used by the asset receiving device in order to ensure integrity of the digital asset (for e.g. detecting accidental changes in data associated with the digital asset during communication). Further, the security code, in an instance, may include (but not limited to) a cyclic redundancy code (CRC). Further, in some embodiments, the digital asset may be encrypted using a public-private key pair before transmitting the digital asset from the asset transmitting device to the asset receiving device. Further, the asset receiving device, in an instance, may be configured to decrypt the encrypted digital asset by using the same public-private key pair.

Further, in some embodiments, the digital asset may include cryptocurrencies that may be transmitted from the first portable electronic device 100 to the at least one second portable electronic device 102 based on the proximity based event. For instance, the user may tap the first portable electronic device 100 on the at least one second portable electronic device 102 (such as an NFC enabled vendor device, for e.g., a card swipe machine) in order to pay required amount using cryptocurrency.

Further, in some embodiments, the digital asset may include a digital visiting card that may be shared with one or more users for social purposes. For instance, the digital visiting card may include social data (e.g. name, address, age, occupational details, contact information, user interests and so on) associated with a user. For instance, a user (that may be operating the first portable electronic device 100) may share the digital visiting card with a second user (that may be operating the at least one second portable electronic device 102) by tapping the first portable electronic device 100 with the at least one second portable electronic device 102. Further, in some embodiments, the user may be allowed to edit the social data (e.g. add and/or remove information in order to ensure privacy) that may be shared with other users by interacting with the first portable electronic device 100 (for e.g. by providing social data through an input device such as a keyboard associated with the first portable electronic device 100). For instance, in a case where a first user (that may be operating the first portable electronic device 100) is on a date with a second user (that may be operating the at least one second portable electronic device 102) and the first user may only wish to share name, and phone number only if the date goes well between them. Accordingly, the first user may tap the first portable electronic device 100 with the at least one second portable electronic device 102 in order to share the social data (such as only the name and the phone number).

Further, in some embodiments, the digital asset may include digital art that may be shared with one or more users on one or more real world occasions (such as, but not limited to, Christmas, international women's day, a movie premier day, and so on). For instance, the digital art may include a unique representation of a fictional character that may be associated with a movie that may be shared with the one or more users on the movie premier day. Further, in another instance, the digital art may include a unique picture of a famous historic woman that may be shared with the one or more users on the international women's day.

Further, in an embodiment, each of the transmitting and the receiving may be performed wirelessly over a Bluetooth Low Energy (BLE) channel. Further, in an embodiment, each of the transmitting and the receiving may be performed wirelessly over a Near Field Communication (NFC) channel over a dynamic NFC mode. Further, each of the transmitting and the receiving may take place at a high speed, in a reliant manner over the dynamic NFC mode. For instance, at least one of the first portable electronic device 100, and the at least one second portable electronic device may toggle between a "read", and a "card emulator mode" when in the dynamic NFC mode.

Figure 15:
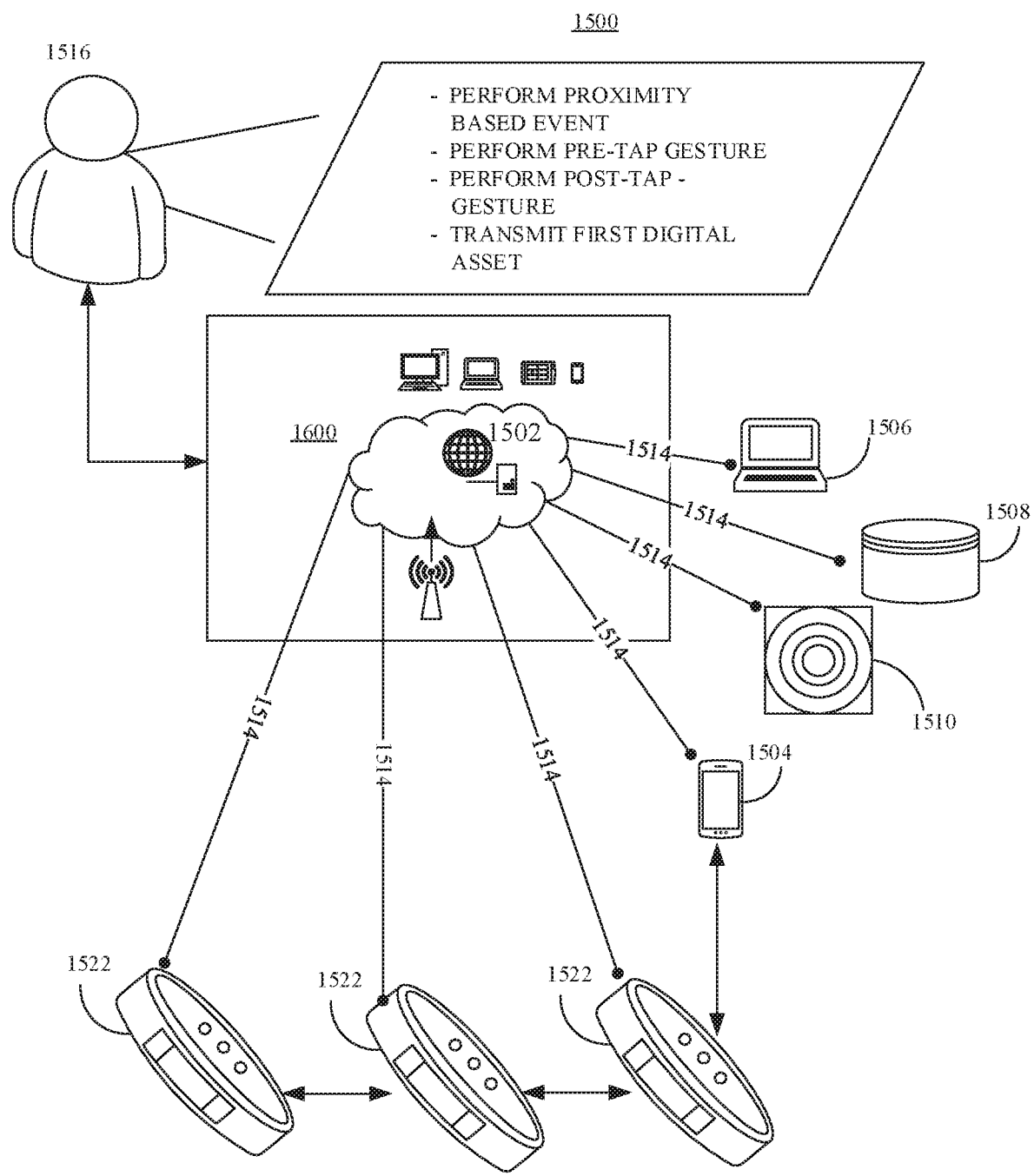
FIG. 15 is an illustration of an online platform consistent with various embodiments of the present disclosure.

Further, in some embodiments, at least one of the first portable electronic device 100 and the at least one second portable electronic device 102, in an instance, may be configured to communicate with an online platform (such as an online platform 1500 as shown in FIG. 15). Accordingly, the online platform, in an instance, may be configured to provide a market user interface for a user (such as the user 1516 as shown in FIG. 15) to perform interactive action associated with the digital asset. Further, the market user interface, in an instance, may be a graphical user interface (GUI) allowing the user to craft, and/or alter one or more digital assets by operating (for e.g. through gestures) the first portable electronic device 100 and/or the at least one second portable electronic device 102. Further, the market user interface, in an instance, may allow the users to observe, manipulate, capture, and/or purchase the one or more digital assets. Further, the market user interface, in an instance, may allow the user to download and/or upload the one or more digital assets from and/or to an online cloud market in order to share the one or more digital assets with other users registered with the online platform.

Further, in some embodiments, the online platform may provide an asset creating interface that may allow the users to create unique digital assets (such as patterns) which may then be shared with other users through the market user interface. Further, the asset creating interface, in an instance, may allow the user to make and/or create the digital asset through, for e.g., a movement of one or more body part of the user where the user may be wearing a wearable electronic device (e.g. the first portable electronic device 100). Further, the movement, in an instance, may be sensed by the at least one sensor device (such as a motion sensor) associated with the first portable electronic device 100. For instance, the user may create a shape (such as a triangular shape) by moving the hands (that may be holding the first portable electronic device 100) in a triangular form in an actual space.

Further, in some embodiments, at least one of the first portable electronic device 100 and the at least one second portable electronic device 102 may include an unmanned aerial vehicle (UAV), such as a delivery drone. Further, the delivery drone, in an instance, may be the unmanned aerial vehicle that may be used by one or more logistic companies (such as DHL, Amazon logistics etc.) in order to deliver one or more packages. Further, a user (that may be operating the first portable electronic device 100), in an instance, may accept the one or more packages delivered by the delivery drone by providing a one-time code to the delivery drone through the first portable electronic device 100. For example, the user may tap the first portable electronic device 100 with the delivery drone to transmit the digital asset (e.g. the one time code) from the first portable electronic device 100 to the delivery drone in order to accept the one or more packages delivered by the delivery drone.

Further, in some embodiments, at least one of the first portable electronic device 100 and the at least one second portable electronic device 102 may include an embedded electronic device. Further, the embedded electronic device may be embedded in a body of the user 1516.

Further, in some embodiments, at least one of the first portable electronic device 100 and the at least one second portable electronic device 102 may include a printed electronic device. Further, the printed electronic device may be printed on one or more substrates using printing equipment suitable for defining patterns on material, such as screen printing, flexography, gravure, offset lithography, and inkjet.

Further, in some embodiments, at least one of the first portable electronic device 100 and the at least one second portable electronic device 102 may include a 3D display device. Further, the 3D display device may comprise a 3D display configured for displaying the second digital asset associated with the 3D display device. Further, the second digital asset corresponding to the second digital device may comprise 3D digital art, one or more 3D patterns, and so on.

Further, in an embodiment, at least one of the first portable electronic device 100 and the at least one second portable electronic device 102 may include a flexible display configured for displaying one or more images, patterns, and art associated with the second digital asset.

Further, in some embodiments, at least one of the first portable electronic device 100 and the at least one second portable electronic device 102 may include a holographic display device. Further, the holographic display device may comprise a holographic display configured for displaying the second digital asset associated with the holographic display device. Further, the second digital asset corresponding to the second digital device may comprise holographic digital art, one or more holographic patterns, and so on.

Figure 3:
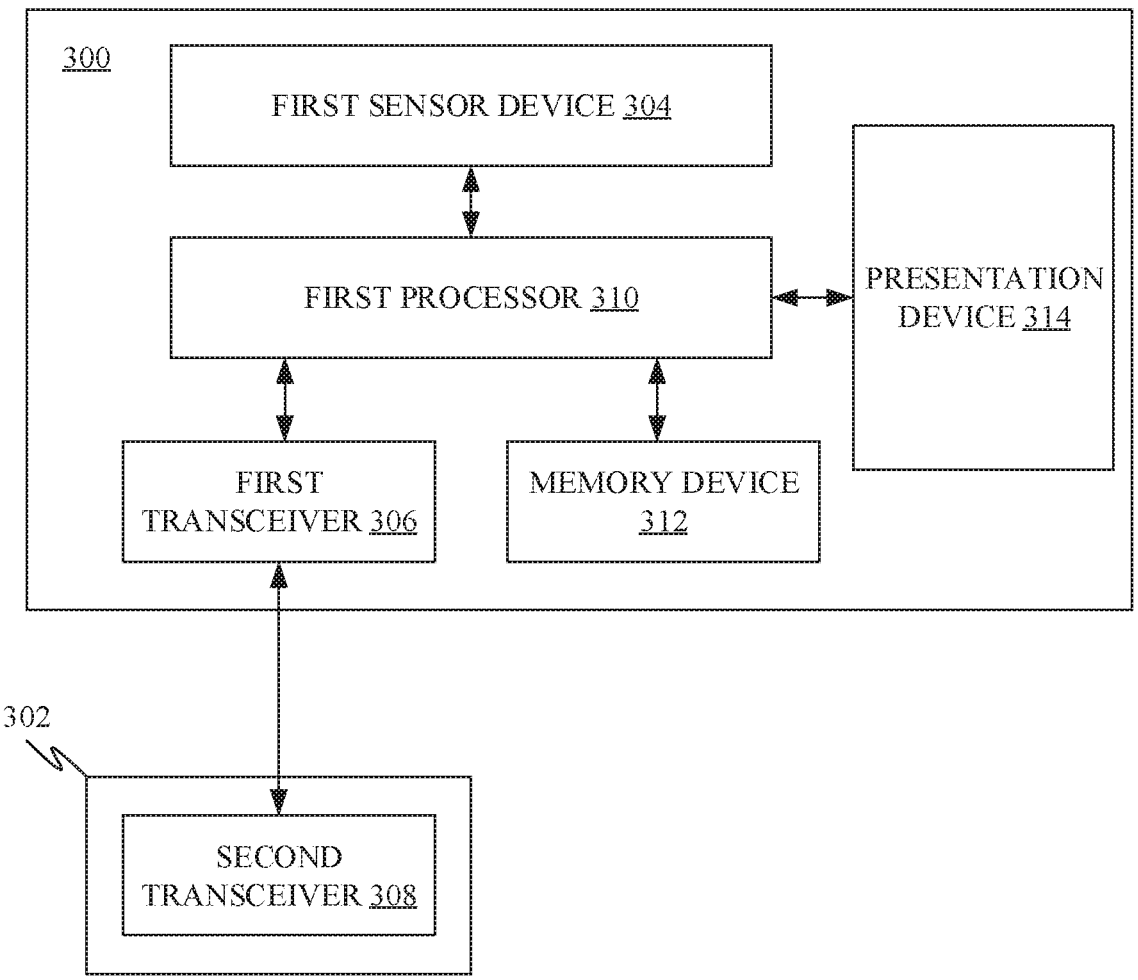
FIG. 3 is a block diagram representation of a first portable electronic device for facilitating a proximity based interaction with a second portable electronic device, in accordance with some embodiments.

FIG. 3 is an exemplary block diagram representation of a first portable electronic device 300 facilitating a proximity based interaction with at least one second portable electronic device 302, in accordance with some embodiments. Further, the proximity based interaction, in an instance, may be near field communication (such as transfer of a digital asset) between the first portable electronic device 300 and the at least one second portable electronic device 302. Further, the digital asset, in an instance, may include any digital data such as (but not limited to) a textual content, Patterns, a visual content, an audio content, an audiovisual content, and so on. In some embodiments, at least one of the first portable electronic device 300 and the at least one second portable electronic device 302 may be a wearable electronic device. For instance, the wearable electronic device may include, but not limited to, wristbands, wristwatches (e.g. Apple® watch), smart glasses (e.g. Google Glasses®), E-textiles (e.g. Levi's® commuter trucker Jacket), an NFC enabled ring, and so on. In some embodiments, at least one of the first portable electronic device 300 and the at least one second portable electronic device 302 may be a short range communication enabled object. In some embodiments, the short range communication enabled object may include at least one of an NFC enabled trading card, an NFC enabled poster, an NFC enabled product packaging, an NFC enabled product and an NFC enabled figurine. Further, the NFC enabled trading card, in an instance, may include an electronic card that may be tapped with other portable electronic devices in different combinations to create digital patterns (and/or digital art). Further, the NFC enabled trading card, in an instance, may be embedded with one or more NFC tags and related data payloads. Further, the NFC enabled trading card may be described in conjunction with FIG. 6.

Accordingly, the first portable electronic device 300 may include at least one first sensor device 304 configured to generate at least one first sensor data. In some embodiments, the at least one first sensor device 304 may include at least one of a radio frequency sensor, an image sensor, a proximity sensor, an audio sensor, a motion sensor, and an accelerometer. For instance, the at least one first sensor data may include signals (such as NFC signals) sensed by the at least one first sensor device 304 (such as the radio frequency sensor) that may be used to detect a presence of another portable electronic device (e.g. another NFC based electronic device) in near vicinity.

Further, the first portable electronic device 300 may include a first transceiver 306 configured for communicating with at least one second transceiver 308 associated with the at least one second portable electronic device 302.

Further, the first portable electronic device 300 may include a first processor 310 communicatively coupled with each of the first transceiver 306 and the at least one first sensor device 304. Further, the first processor 310 may be configured for detecting at least one proximity based event based on the at least one first sensor data from the at least one first sensor device 304. Further, in some embodiments, the at least one proximity based event may include at least one of identifying a contact between the first portable electronic device 300 and the at least one second portable electronic device 302, detecting distance between the first portable electronic device 300 and the at least one second portable electronic device 302 to be within a pre-defined range, and a capturing at least one visual code associated with the at least one second portable electronic device 302 using an image sensor of the first portable electronic device 300. For instance, the at least one proximity based event may be detected when the first portable electronic device 300 may make a physical contact with the at least one second portable electronic device 302 (such as touching and/or tapping of the first portable electronic device 300 with the at least one second portable electronic device 302). Further, in another instance, the at least one proximity based event may be detected when the first portable electronic device 300 may be placed close (without making a physical contact) to the at least one second portable electronic device 302 (for e.g. when a separation between the first portable electronic device 300 and the at least one second portable electronic device 302 may be in the predefined range, say 3-20 centimeters). Further, in another instance, the at least one proximity based event may be detected when the first portable electronic device 300 may scan/capture (using the at least one sensor device, such as the image sensor) the at least one visual code (such as, but not limited to, a QR code, a bar code etc.) associated with the at least one second portable electronic device 302.

Further, the first processor 310 may be configured for generating a combined digital asset using a first digital asset and at least one second digital asset based on the detecting. Further, the first digital asset may be obtained from a memory device 312 associated with the first portable electronic device 300. Further, the at least one second digital asset may be obtained from the at least one second portable electronic device 302. Further, the combined digital asset, in an instance, may be a new digital asset that may be formed by inheriting one or more characteristics associated with each of the first digital asset and the at least one second digital asset. For instance, the combined digital asset may include a digital art that may include visual features (such as colors) inherited from a first digital asset and may include physical features (such as size and/or dimensions) inherited from a second digital asset. For instance, if the first digital asset may include a digital art of a fictional character (such as a Pokémon character Pikachu©) and the at least one second digital asset may include a digital pattern of pink color, then the combined digital asset may include a digital art such as (but not limited to) a pink colored Pikachu©.

Further, the first portable electronic device 300 may include a presentation device 314 communicatively coupled with the first processor 310. Further, the presentation device 314 may be configured to present the combined digital asset. Further, the presentation device 314, in an instance, may be any output device that may be used to present the combined digital asset to the user. In some embodiments, the presentation device 314 may include at least one of a display device, an audio device, and a haptic feedback device. Further, the display device, in an instance, may be configured to present the combined digital asset in a way such that the user may be able to view the combine digital asset. For instance, the display device may include, but not limited to) Light emitting diode (LED), Organic LED, Active-matrix OLED, Liquid crystal display (LCD), 3D display, flexible display, holographic display, and so on. Further, the audio device, in an instance, may be configured to present the combined digital asset in a way such that the user may be able to perceive audible characteristics associated with the combined digital asset. For instance, the audio device may include, but not limited to, a speaker. Further, the haptic feedback device, in an instance, may be configured to present the combined digital asset in a way such that the user may be able to feel any tactile characteristic associated with the combined digital asset. For instance, the haptic feedback device may include, but not limited to, a vibration motor.

Further, the first portable electronic device 300 may include the memory device 312 configured for storing the combined digital asset and the first digital asset.

Figure 4:
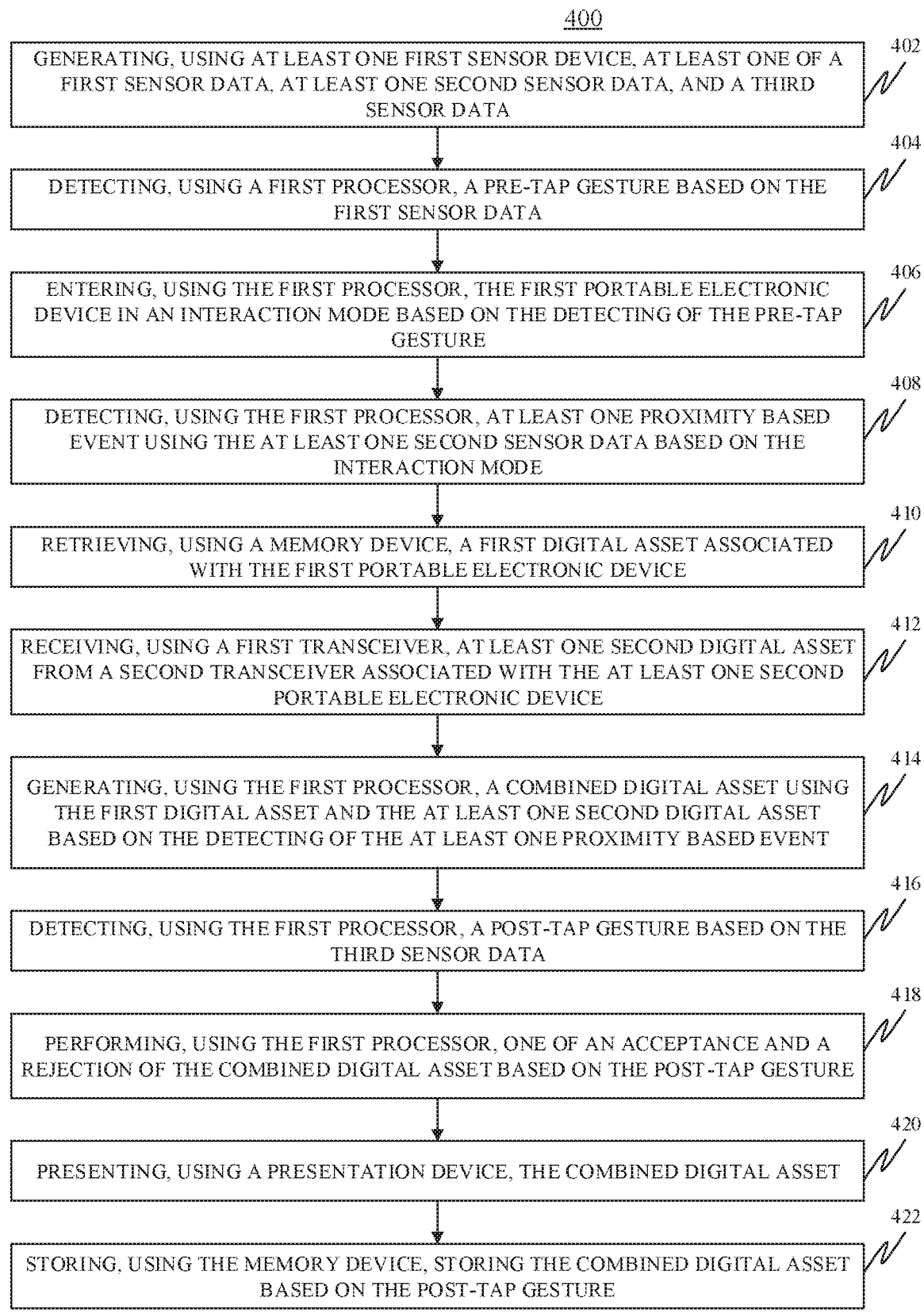
FIG. 4 is a flowchart of a method for facilitating a proximity based interaction between a first portable electronic device and at least one second portable electronic device, in accordance with some embodiments.

FIG. 4 is a flowchart of a method 400 for facilitating a proximity based interaction between a first portable electronic device and at least one second portable electronic device, in accordance with some embodiments. Further, the proximity based interaction, in an instance, may be near field communication (such as transfer of digital asset) between the first portable electronic device and the second portable electronic device. Further, the digital asset, in an instance, may include any digital data such as (but not limited to) a textual content, Patterns, a visual content, an audio content, an audiovisual content and so on.

Further, at 402, the method 400 may include generating, using at least one first sensor device (such as the at least one first sensor device 304), at least one of a first sensor data, at least one second sensor data, and a third sensor data. Further, in some embodiments, the at least one first sensor device may include at least one of a radio frequency sensor, an image sensor, a proximity sensor, an audio sensor, a motion sensor, and an accelerometer. For instance, the first sensor data may be any user input data (such as data associated with motion, physical contact, audio etc.) sensed by the at least one sensor device (such as, but not limited to, a motion sensor, an audio sensor etc.) that may be used to detect a user input (such as, but not limited to, user tapping, an audio input etc.) associated with the first portable electronic device. For instance, the at least one second sensor data may include signals (such as NFC signals) sensed by the at least one first sensor device (such as the radio frequency sensor) that may be used to detect a presence of another portable electronic device (e.g. another NFC based electronic device)

in near vicinity. Further, in an instance, the third sensor data may be any data (such as data associated with acceleration forces) from the at least one sensor device (such as an accelerometer) that may be used to detect a movement (such as shaking) associated with the first portable electronic device.

Further, at 404, the method 400 may include detecting, using a first processor (such as the first processor 310), a pre-tap gesture based on the first sensor data. Further, the pre-tap gesture may be any gesture/input performed/provided by a user before initiating the proximity based interaction between the first portable electronic device and the second portable electronic device. Further, in some embodiments, the pre-tap gesture may include at least one of a shaking of the first portable electronic device, a movement of the first portable electronic device in a pre-defined manner, and a user touching at least a portion of the first portable electronic device. For instance, the pre-tap gesture may include a user (that may be wearing the first portable electronic device as a wristband) shaking their wrist (for e.g. two times). Further, in another instance, the pre-tap gesture may include a user touching, such as tapping (for e.g. with hand), on at least one portion of the first portable electronic device. Further, in another instance, the pre-tap gesture may include a user moving the first portable electronic device in a pre-defined manner (such as in a circular motion).

Further, at 406, the method 400 may include entering, using the first processor, the first portable electronic device in an interaction mode based on the detecting of the pre-tap gesture. Further, the interaction mode, in an instance, may be a state of the first portable electronic device that may allow the first portable electronic device to proceed for the proximity based interaction with the second portable electronic device. Further, the interaction mode, in an instance, may include modes such as (but not limited to) a sending mode, a receiving mode, and/or an exchanging mode etc. For instance, the first portable electronic device, when in the sending mode, may be configured to transmit the digital asset to the second portable electronic device. Further, in another instance, the first portable electronic device, when in the receiving mode, may be configured to receive the digital asset from the second portable electronic device. Further, in another instance, the first portable electronic device, when in the exchanging mode, may be configured to exchange one or more digital asset by transmitting one digital asset from the first portable electronic device to the second portable electronic device and receiving another digital asset from the second portable electronic device to the first portable electronic device.

Further, at 408, the method 400 may include detecting, using the first processor, at least one proximity based event using the at least one second sensor data based on the interaction mode. Further, in some embodiments, the at least one proximity based event may include at least one of identifying a contact between the first portable electronic device and the at least one second portable electronic device, detecting distance between the first portable electronic device and the at least one second portable electronic device to be within a pre-defined range, and a capturing at least one visual code associated with the at least one second portable electronic device using an image sensor of the first portable electronic device. For instance, the at least one proximity based event may be detected when the first portable electronic device may make a physical contact with the at least one second portable electronic device (such as touching and/or tapping of the first portable electronic device with the at least one second portable electronic device). Further, in another instance, the at least one proximity based event may be detected when the first portable electronic device may be placed close (without making a physical contact) to the at least one second portable electronic device (for e.g. when a separation between the first portable electronic device and the at least one second portable electronic device may be in the predefined range, say 3-20 centimeters). Further, in another instance, the at least one proximity based event may be detected when the first portable electronic device may scan/capture (using the at least one sensor device, such as the image sensor) the at least one visual code (such as, but not limited to, a QR code, a bar code etc.) associated with the at least one second portable electronic device.

Further, at 410, the method 400 may include retrieving, using a memory device (such as the memory device 312), a first digital asset associated with the first portable electronic device.

Further, at 412, the method 400 may include receiving, using a first transceiver (such as the first transceiver 306), at least one second digital asset from a second transceiver associated with the at least one second portable electronic device.

Further, at 414, the method 400 may include generating, using the first processor, a combined digital asset using the first digital asset and the at least one second digital asset based on the detecting of the at least one proximity based event. Accordingly, the combined digital asset, in an instance, may be a new digital asset that may be formed by inheriting one or more characteristics associated with each of the first digital asset and the at least one second digital asset. For instance, the combined digital asset may include a digital art that may include visual features (such as colors) inherited from a first digital asset and may include physical features (such as size and/or dimensions) inherited from a second digital asset. For instance, if the first digital asset may include a digital art of a fictional character (such as a Pokémon character Pikachu©) and the at least one second digital asset may include a digital pattern of pink color, then the combined digital asset may include a digital art such as (but not limited to) a pink colored Pikachu©.

Further, at 416, the method 400 may include detecting, using the first processor, a post-tap gesture based on the third sensor data. Further, the post-tap gesture may be any gesture (and/or user input) performed (and/or provided) by the user (after generating the combined digital asset) in order to accept and/or retract the combine digital asset. Further, in some embodiments, the post-tap gesture may include at least one of a shaking of the first portable electronic device, a movement of the first portable electronic device in a pre-defined manner, and a user touching at least a portion of the first portable electronic device. For instance, the post-tap gesture may include a user (that may be wearing the first portable electronic device as a wristband) shaking their wrist, for e.g., two times to retract and/or one time to accept the digital asset received from the second portable electronic device. Further, in another instance, the post-tap gesture may include a user touching, such as tapping on at least one portion of the first portable electronic device, for e.g. tapping one time to accept and two times to retract the digital asset. Further, in another instance, the post-tap gesture may include a user moving the first portable electronic device in a specified manner (such as in a circular motion to accept the digital asset).

Further, at 418, the method 400 may include performing, using the first processor, one of an acceptance and a rejection of the combined digital asset based on the post-tap gesture. For instance, the acceptance of the combined digital asset (based on the post-tap gesture), in an instance, may allow the first portable electronic device to accept and/or store the combined digital asset. Further, the rejection of the combined digital asset (based on the post-tap gesture), in an instance, may allow the first portable electronic device to retract back the combined digital asset.

Further, at 420, the method 400 may include presenting, using a presentation device (such as the presentation device 314), the combined digital asset. Further, the presentation device, in an instance, may be any output device that may be used to present the combined digital asset to the user. In some embodiments, the presentation device may include at least one of a display device, an audio device, and a haptic feedback device. Further, the display device, in an instance, may be configured to present the combined digital asset in a way such that the user may be able to view the combine digital asset. For instance, the display device may include, but not limited to) Light emitting diode (LED), Organic LED, Active-matrix OLED, Liquid crystal display (LCD), 3D display, flexible display, holographic display, and so on. Further, the audio device, in an instance, may be configured to present the combined digital asset in a way such that the user may be able to perceive audible characteristics associated with the combined digital asset. For instance, the audio device may include, but not limited to, a speaker. Further, the haptic feedback device, in an instance, may be configured to present the combined digital asset in a way such that the user may be able to feel any tactile characteristic associated with the combined digital asset. For instance, the haptic feedback device may include, but not limited to, a vibration motor.

Further, at 422, the method 400 may include storing, using the memory device, storing the combined digital asset based on the post-tap gesture.

Further, according to some embodiments, a first portable electronic device facilitating a proximity based interaction with at least one second portable electronic device. Further, the first portable electronic device may include at least one first sensor device configured to generate at least one of a first sensor data, at least one second sensor data, and a third sensor data.

Further, the first portable electronic device may include a first transceiver configured for communicating with at least one second transceiver associated with the at least one second portable electronic device.

Further, the first portable electronic device may include a first processor communicatively coupled with each of the first transceiver and the at least one first sensor device. Further, the first processor may be configured for detecting a pre-tap gesture based on the first sensor data.

Further, the first processor may be configured for entering the first portable electronic device in an interaction mode based on the detecting of the pre-tap gesture.

Further, the first processor may be configured for detecting at least one proximity based event using the at least one second sensor data based on the interaction mode.

Further, the first processor may be configured for generating a combined digital asset using a first digital asset and at least one second digital asset based on the detecting of the at least one proximity based event. Further, the first digital asset may be obtained from a memory device associated with the first portable electronic device. Further, the at least one second digital asset may be obtained from the at least one second portable electronic device.

Further, the first processor may be configured for detecting a post-tap gesture based on the third sensor data.

Further, the first processor may be configured for performing one of an acceptance and a rejection of the combined digital asset based on the post-tap gesture.

Further, the first portable electronic device may include a presentation device communicatively coupled with the first processor. Further, the presentation device may be configured to present the combined digital asset. Further, the presentation device may include at least one of a display device, an audio device, and a haptic feedback device.

Further, the first portable electronic device may include the memory device configured for storing the combined digital asset based on the post-tap gesture.

In some embodiments, at least one of the first portable electronic device and the at least one second portable electronic device may be a wearable electronic device.

In some embodiments, at least one of the first portable electronic device and the at least one second portable electronic device may be a short range communication enabled object. Further, in some embodiments, the short range communication enabled object may include at least one of an NFC enabled trading card, an NFC enabled poster, and an NFC enabled product packaging.

In some embodiments, at least one of the pre-tap gesture and the post-tap gesture may include at least one of a shaking of the first portable electronic device, a movement of the first portable electronic device in a pre-defined manner, and a user touching at least a portion of the first portable electronic device.

According to some embodiments, a system to facilitate control and programming of keyboard-less and display-less devices and wearables via Near Field Communications ("NFC"), Near Field Magnetic Induction ("NFMI"), or print-encoded ("QR") tagged trading cards, devices, or other objects is disclosed.

Further, henceforth, "Band" may be used for brevity and may include a wristband, phone, or other programmable device, such as with an optical camera. Further, NFC and NFMI may be utilized or embodied as the close-proximity-based communication mechanism. "NFC" may be utilized for brevity henceforth. Further, "Tap" may include physically touching or coming within a predetermined allowable range of NFC (such as less than 20 cm) or NFMI (such as less than 3 meters). Further, the predetermined allowable range may vary and evolve based on environmental limitations and communication technology advances. Further, "QR" and "QR Encoded" may include actual QR Codes or similar print encodes for optical recognition. Further, "Scan" or "Scanned" may include optically scanning a QR code, object, or other optical pattern recognition. Further, Pattern, or "effect" may include an encoded pattern or effect, or pattern or effect instructions.

Figure 5:
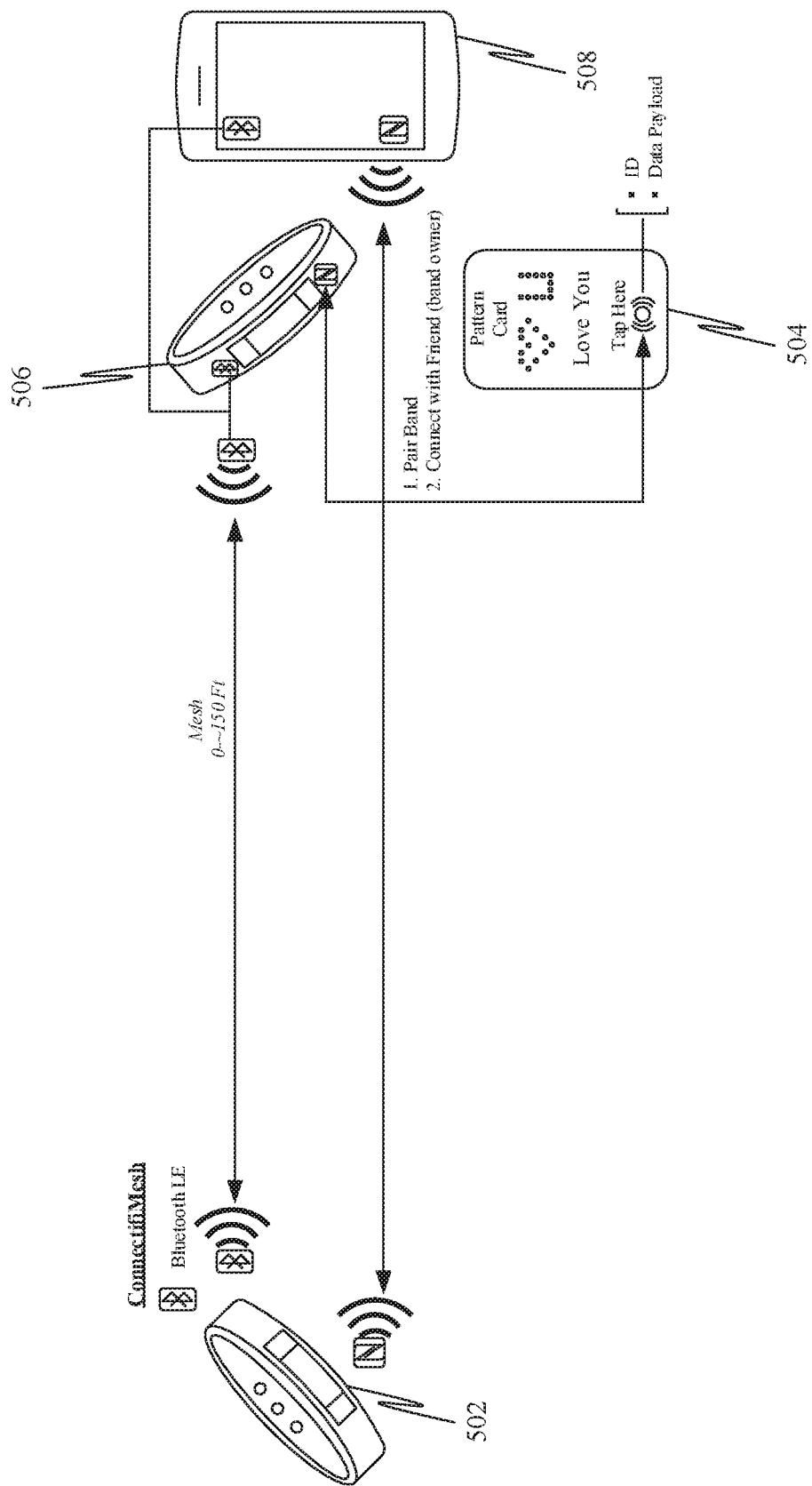
FIG. 5 is a representation of a system for facilitating a proximity based interaction between a first portable electronic device, such as a TapMagic band, and a second portable electronic device, such as a TapMagic band, in accordance with some embodiments.

FIG. 5 is an exemplary representation of a portable electronic device, such as a TapMagic band 502, for facilitating a proximity based interaction with a TapMagic trading card 504, in accordance with some embodiments. A user (such as the user 1516 as shown in FIG. 15) may purchase the TapMagic band 502 that may be packaged with one or more of the TapMagic trading card 504. In an embodiment, the one or more of the TapMagic trading card 504 may be purchased separately. Further, the user may perform a proximity based event, such as a tap in the vicinity of the TapMagic trading card 504 to create, or transmit a digital art (corresponding to a second digital asset of the TapMagic trading card 504), which may consist of visual, haptic, and audio elements.

In some embodiments, the user may also tap a second TapMagic band 506 to transmit a first digital asset associated with the TapMagic band 502, such as one or more of a digital art, pattern, and so on. Further, in some embodiments, the portable electronic device may include a user device 508. Further, a device firmware of the user device 508 may be configured to read the second TapMagic band 506 and react to an object identifier of the second TapMagic band 506. Further, the user device 508 may be configured to receive the second digital asset. Further, in an instance, the user device 508 may be configured to modify the second digital asset. Further, in an instance, the user device 508 may be configured to transmit a third digital asset associated with the user device to the TapMagic trading card 504.

Further, in an embodiment, the portable electronic device, including the TapMagic band 502, and the user device 508 may include a Host App MCU, such as an NRF52832 or equivalent, an NFC tag, an NFC reader IC, such as a CR95HF or equivalent, an accelerometer, such as BMA280 or equivalent, an OLED display, such as a CFAL9664B-F-B2 or equivalent, LEDs, and custom proprietary firmware to support device interaction and content/state sharing.

Further, in some embodiments, the portable electronic device may include a standalone NFC reader, and a standalone NFC writer that may read one or more NFC tags corresponding to the short range communication enabled object. Further, the portable electronic device may be configured to be presented as an NFC tag to the short range communication enabled object. Further, the portable electronic device may include firmware that may read an NFC tag of the short range communication enabled object as a complex input. Further, the portable electronic device may be configured to change an operation of the NFC tag of the short range communication enabled object after reading.

Further, according to some embodiments, a system to facilitate close-proximity digital creation is disclosed.

For instance, if the portable electronic device includes a mobile device, and the short range communication enabled object comprises the NFC enabled trading card, a user may launch a mobile application and may enter a point-and-shoot "create" mode with a window in an upper part, and an 'under construction' view in a lower part of a screen of the mobile device. Further, the proximity based event may include a tap of the mobile device with the NFC based trading card. Further, a second object identifier and the second digital asset may be transmitted to the mobile device. Further, the second digital asset, such as a pattern of the NFC enabled trading card may be automatically reflected in the under construction view. Further, the user may view a first digital asset corresponding to the mobile device, and may transmit the first digital asset to the short range communication enabled object. Further, in an instance, the user may customize the second digital asset, such as by tapping with one or more short range communication enabled objects (trading cards) corresponding to one or more patterns, effects, colors, movement type and speed, and so on.

Further, the one or more NFC enabled trading cards may correspond to at least one of, but may not be limited to, six key groups.

Figure 6:
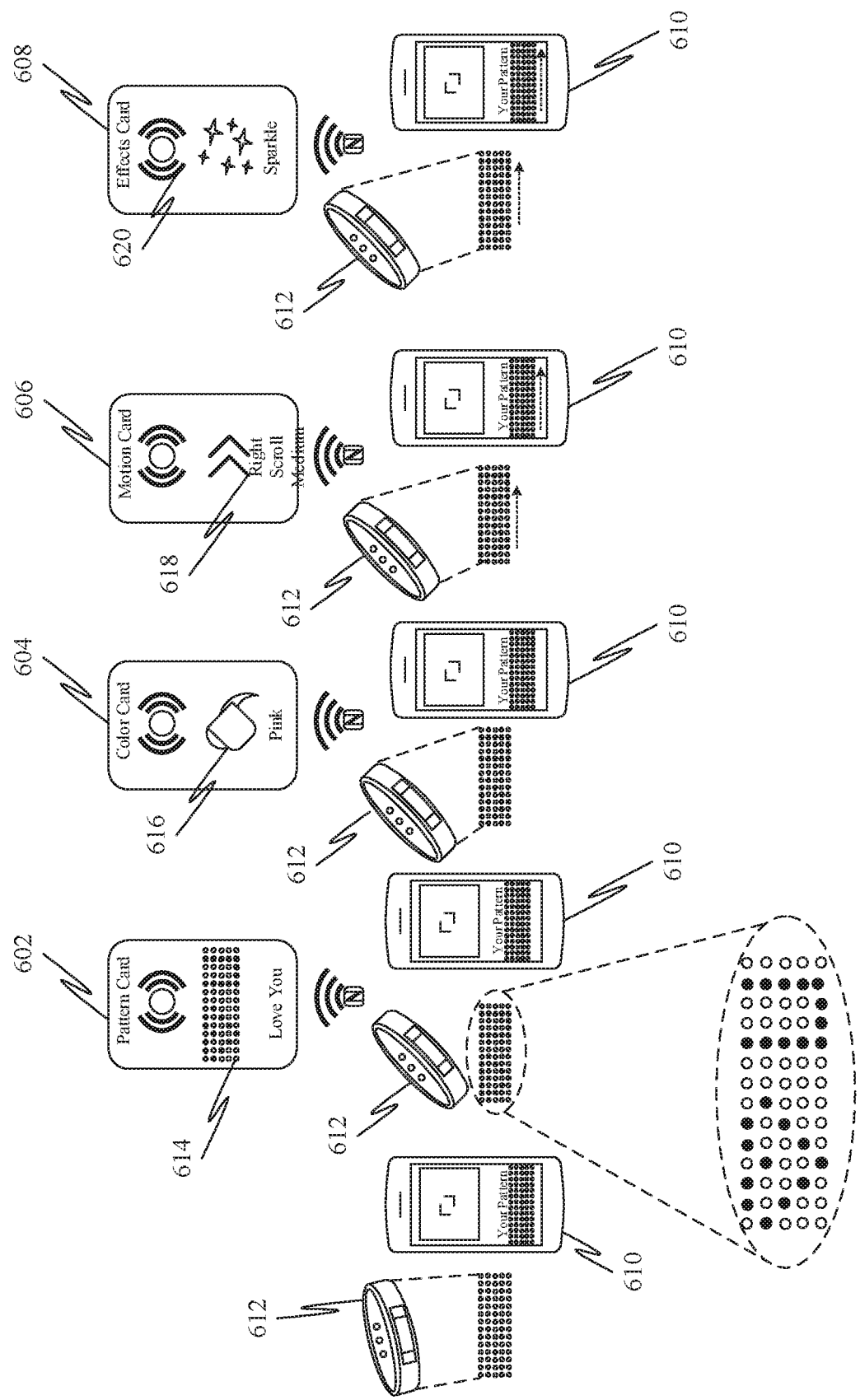
FIG. 6 is a representation of a system for facilitating a proximity based interaction between a first portable electronic device and a second portable electronic device, showing a plurality of types of NFC enabled trading cards, in accordance with some embodiments.

For instance, the one or more NFC enabled trading cards may correspond to a "pattern" group. For instance, as shown in FIG. 6, a pattern card 602 may correspond to the "pattern" group. Further, the pattern card 602 may be configured to display one or more patterns through the one or more electronic components. Further, a second digital asset of the pattern card 602 may include the one or more patterns, such as the pattern 614. Further, a user device such as a mobile device 610, or a wearable device 612 may receive the pattern 614 on performing a proximity based event corresponding to the pattern card 602.

Further, in an instance, the one or more NFC enabled trading cards may correspond to a "color" group. For instance, as shown in FIG. 6, a color card 604 may correspond to the "color" group. Further, the color card 604 may be configured to display and one or more colors through the one or more electronic components. Further, a second digital asset of the color card 604 may include the one or more colors. For instance, the second digital asset of the color card 604 may include the color pink 616. Further, the mobile device 610, or the wearable device 612 may perform a proximity based event in the vicinity of the color card 604, and may receive the color pink 616. Further, the pattern 614 may be modified, and may include the color pink 616.

Further, in an instance, the one or more NFC enabled trading cards may correspond to a "movement type and speed" group. For instance, as shown in FIG. 6, a movement type and speed card 606 may correspond to the "movement type and speed" group. Further, the movement type and speed card 606 may be configured to display one or more moving patterns through the one or more electronic components. Further, a second digital asset associated with the movement type and speed card 606 may comprise a movement and speed effect, such as right scroll medium effect 618. Further, the mobile device 610, or the wearable device 612 may perform a proximity based event in the vicinity of the movement type and speed card 606, and may receive the right scroll medium effect 618. Further, the pattern 614 may be modified, and may include the right scroll medium effect 618.

Further, in an instance, the one or more NFC enabled trading cards may correspond to a "effects" group. For instance, as shown in FIG. 6, an effect card 608 may correspond to the "effects" group. Further, the effect card 608 may be configured to display one or more effects, such as a sparkle effect 620, increased or decreased brightness, blinking, and so on, which may be displayed through the one or more electronic components. Further, the mobile device 610, or the wearable device 612 may perform a proximity based event in the vicinity of the effect card 608, and may receive the sparkle effect 620. Further, the pattern 614 may be modified, and may include the sparkle effect 620.

Further, in an instance, the one or more NFC enabled trading cards may correspond to a "star" group. Further, the one or more NFC enabled trading cards may be configured to display one or more pre-built patterns, such as including one or more effects, and movement, and may represent one or more collectible characters, or celebrities. For instance, the one or more collectible characters may correspond to fictional characters corresponding to one or more video games, comics, TV shows, movies, and so on. Further, the one or more celebrities may include actors, sports players, and so on.

Further, according to some embodiments, a system to facilitate close-proximity content and state sharing, and dynamic interactions is disclosed. The system may facilitate sharing of content with one or more devices, such as with short range communication enabled objects (e.g. trading cards) through a simple "Tap".

For instance, the short range communication enabled object may comprise an NFC enabled trading card providing a 'bank' of action capabilities. For example, an "8× Card" NFC enabled trading card may be configured to perform the predetermined event, such as sharing of an associated pattern (second digital asset) with the portable electronic device, such as a wearable object upon detection of the proximity based event (such as a tap from the portable electronic device) up to 8 times until the 'bank' is depleted. Further, upon detection of a proximity based event, the NFC enabled trading card may be configured to perform the predetermined event, such as transmitting of the second digital asset. Further, the short range communication enabled object may be marked as "used" by the portable electronic device.

Figure 7:
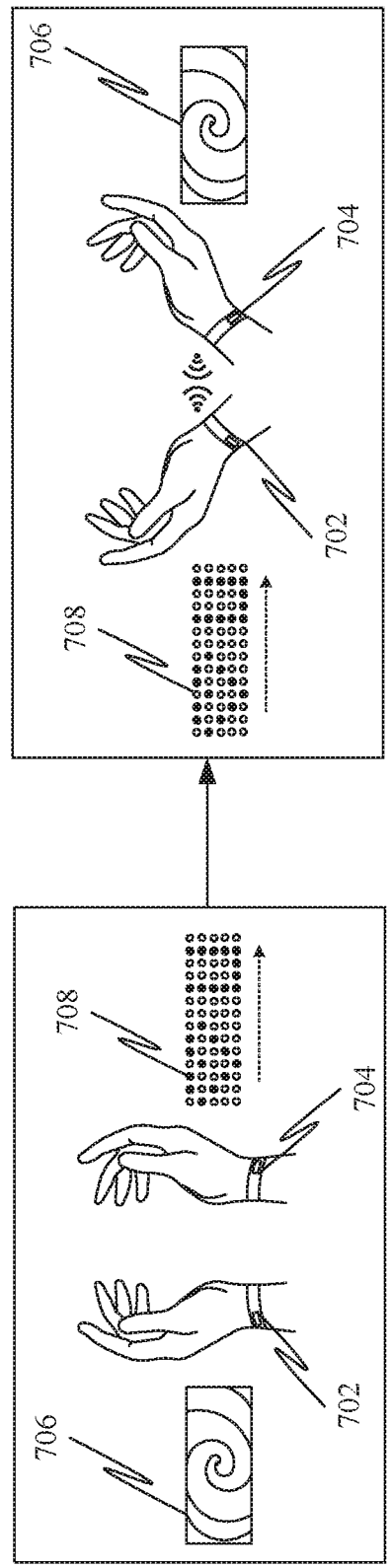
FIG. 7 is a representation of a system for facilitating a proximity based interaction between a first portable electronic device and a second portable electronic device, showing an exchange of digital assets, in accordance with some embodiments.

Further, in an embodiment, as shown in FIG. 7, the portable electronic device may comprise a first wearable band 702, and a second wearable band 704. Further, the predetermined action may include transmitting a first digital asset associated with the first wearable band 702 to the second wearable band 704.

Further, the predetermined action may include receiving a second digital asset associated with the second wearable band 704.

Further, the predetermined action may be exchanging the first digital asset, such as a first pattern 706, and the second digital asset, such as a second pattern 708 between the first wearable band 702, and the second wearable band 704.

Further, in some embodiments, the short range communication enabled object may include a second portable electronic device. Further, the first digital asset may include a first user interest associated with a first user of the portable electronic device. Further, the second digital asset may include a second user interest associated with a second user of the second portable electronic device. Accordingly, the predetermined action may include transmitting a second notification to the second portable electronic device. Further, the predetermined action may include creating a group of two or more portable electronic devices including the first portable electronic device and the second portable electronic device. For example, the first user interest (more generally a first profile) and the second user interest (more generally a second user profile) may include a commonality. As a result, the second notification transmitted to the second portable electronic device may enable the second user to initiate and/or establish an online and/or an offline contact with the first user associated with the portable electronic device. Further, in some embodiments, at least one of detecting the proximity and transmitting of the second notification is based on at least one of the first user attribute and the second user attribute. Further, at least one of the first user attribute and the second user attribute may be configurable by one or more users.

Further, in some embodiments, the processing device may be further configured for initiating a countdown timer associated with a predetermined time duration based on creating the group of portable electronic devices. Further, the processing device may be further configured for detecting a second proximity based event based on receiving the received short range communication signal from a third portable electronic device within expiration of the countdown timer. Further, the processing device may be configured for transmitting a third notification to the third portable electronic device based on the detecting. Further, the processing device may be configured for updating the group of portable electronic devices to include the third portable electronic device. Additionally, the processing device may be configured for synchronizing at least one of time and digital asset across the group of portable electronic devices. Further, upon creation and/or updating of the group, the countdown timer may be re-initiated providing a time window for a subsequent portable electronic device to be added to the group.

Further, in some embodiments, the processing device may be further configured for generating a shared digital asset based on the first digital asset, the second digital asset and the third digital asset. Further, the transceiver may be further configured for transmitting the shared digital asset to each of the second portable electronic device and the third portable electronic device. Accordingly, the portable electronic device in some instances may function as a master friend in order to facilitate creation of the shared digital asset such as a virtual meetup room. Accordingly, the virtual meetup room may include digital representations of each of the first user, the second user and the third user in the form of a first avatar, a second avatar and a third avatar respectively.

Further, in some embodiments, generating the shared digital asset may be based on a state of the portable electronic device. Further, the state of the portable electronic device may include at least one first characteristic of the first digital asset. For instance, in an instance the shared digital asset may include a first reward associated with the first user. Accordingly, the first reward may be generated based on a first characteristic of the first digital asset, such as, for example, the first avatar. For instance, the first reward may be generated only if the first avatar does not already possess the first reward. Likewise, a second reward may be generated by the second portable electronic device based on a second characteristic of the second digital asset. Similarly, a third reward may be generated by the third portable electronic device based on a third characteristic of the third digital asset.

Figure 8:
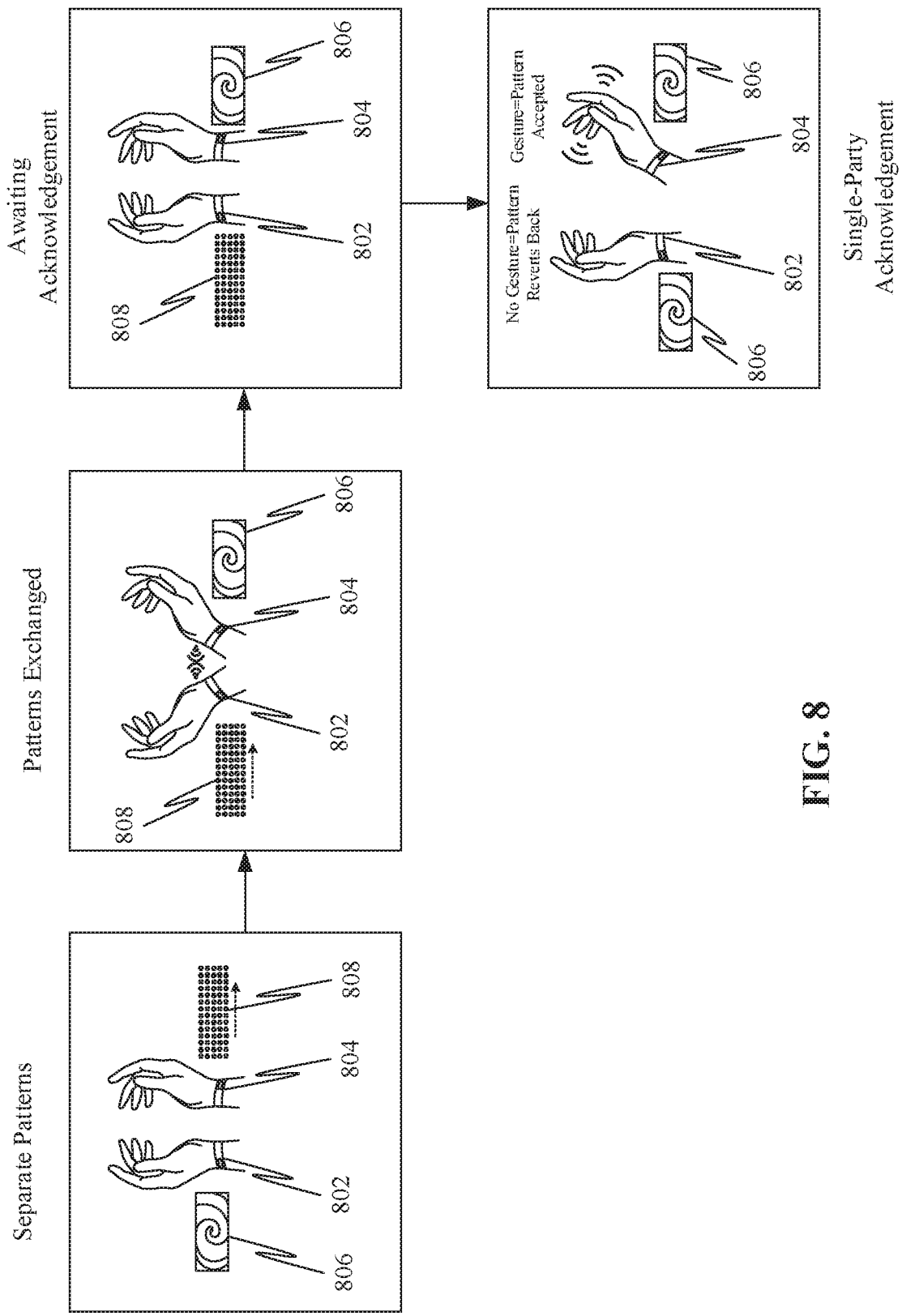
FIG. 8 is a representation of a system for facilitating a proximity based interaction between a first portable electronic device and a second portable electronic device, including a pre-tap gesture and a post-tap gesture, in accordance with some embodiments.

For instance, as shown in FIG. 8, the portable electronic device may comprise a first wearable band 802, and a second portable device may comprise a second wearable band 804. Further, the 'pre-tap' gesture may comprise execution of a shake gesture to put the first wearable band 802, and the second wearable band 804 into the "share mode". Further, upon detection of the pre-tap gesture, the predetermined action may be performed.

Further, the predetermined action may include at least one of transmitting the first digital asset to the second wearable band 804, receiving a third digital asset from the second wearable band 804, exchanging the first digital asset and the third digital asset between the first wearable band 802 and the second wearable band 804 based on the "share mode".

Further, the first processor 110 may be configured for detecting the post-tap gesture from the first wearable band 802. Further, the predetermined action may be accepted based on the detecting of the post-tap gesture. For instance, the post-tap gesture may comprise execution of a shake gesture. Further, upon detection of the post-tap gesture, such as through analysis of sensory information retrieved from the one or more sensors (for e.g. accelerometers) associated with the first wearable band 802 the predetermined action, may be accepted, such as comprising least one of an actualization and a saving of the first digital asset, such as a first pattern 806 and the third digital asset, such as a second pattern 808. For instance, the first wearable band 802 may not perform the post-tap gesture (say within the predetermined time) resulting in reverting the digital asset (such as storing the first pattern 806 instead of the second pattern 808 after the predetermined action). Further, the second wearable band 804, in an instance, may perform the post-tap gesture (say within the predetermined time) resulting in accepting the digital asset such as storing the first pattern 806 after the predetermined action.

In an embodiment, two mobile applications may share content with a Tap as well as require gesture-based acknowledgements. In an embodiment, an application or device state, such as a coupon, a "bank" of points/tokens, or certain level/status within a game, etc. may be shared. Further, in an embodiment, the system may facilitate dynamic, bi-direction interactions like reading and then invalidating a single use coupon. When a coupon Card is Tap'd to a Band, the Band may read the coupon payload and then write data to the coupon Card which decrements a 'number of uses' counter within the card. Once a coupon Card with a 'number of uses counter of zero is Tap'd to a Band, the coupon Card may be treated as invalid.

Figure 9:
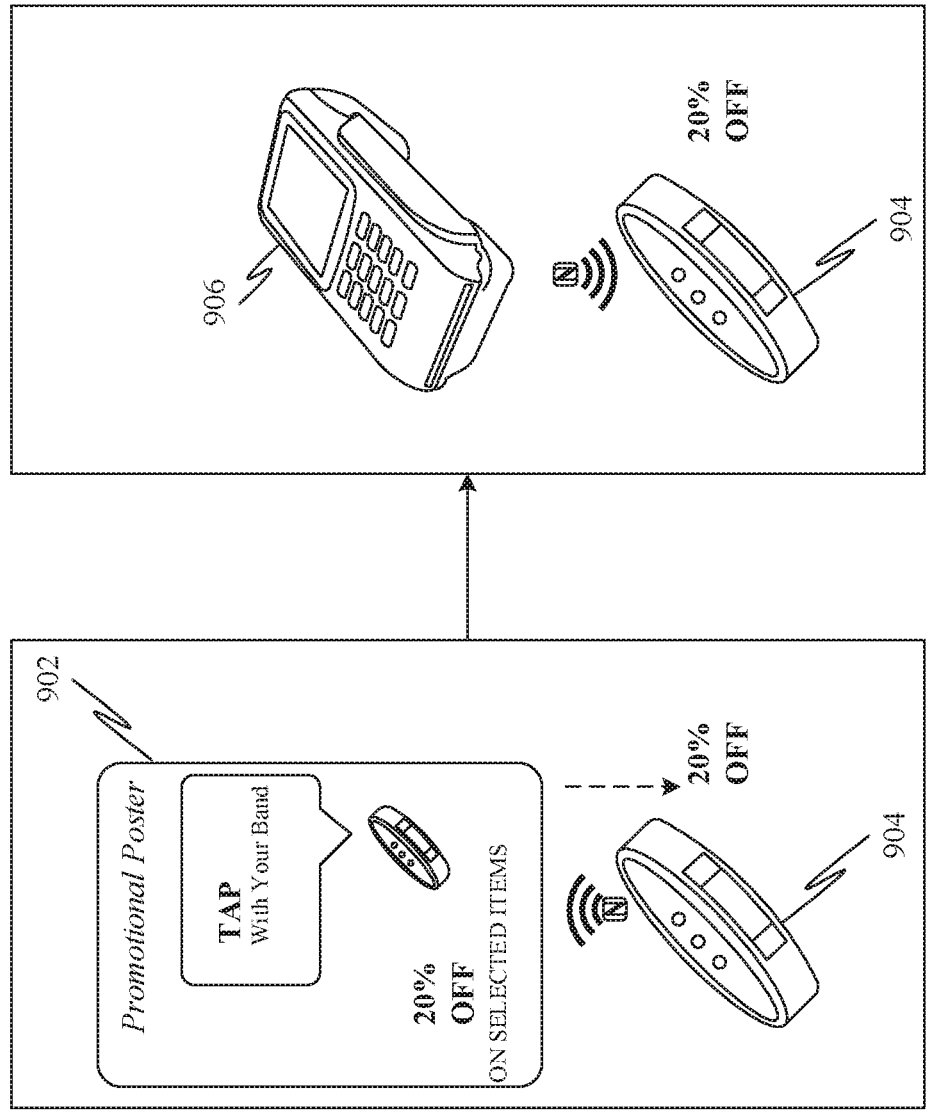
FIG. 9 is a representation of a system for facilitating a proximity based interaction between a first portable electronic device and a second portable electronic device, wherein the second portable electronic device comprises an NFC enabled poster at a venue, in accordance with some embodiments.

Further, in an embodiment, the short range communication enabled object may include a poster 902 (as shown in FIG. 9) within a venue. Further, the second digital asset associated with the poster 902 may comprise discount coupons corresponding to the venue. Further, upon detection of a proximity based event, such as a tap of the portable electronic device, such as a wearable band 904, the predetermined action, comprising a receiving of the second digital asset (the discount coupons) from the poster 902 may be performed. For instance, the discount coupons may comprise coupons allowing the user to avail 20% discount on selected items. Further, the second digital asset may be utilized by the wearable band 904 by transmission of the second digital asset (coupons allowing the user to avail 20% discount on selected items) to a vendor device 906. Further, in an instance, the portable electronic device may be configured to be presented as the coupon to the vendor device.

Figure 10:
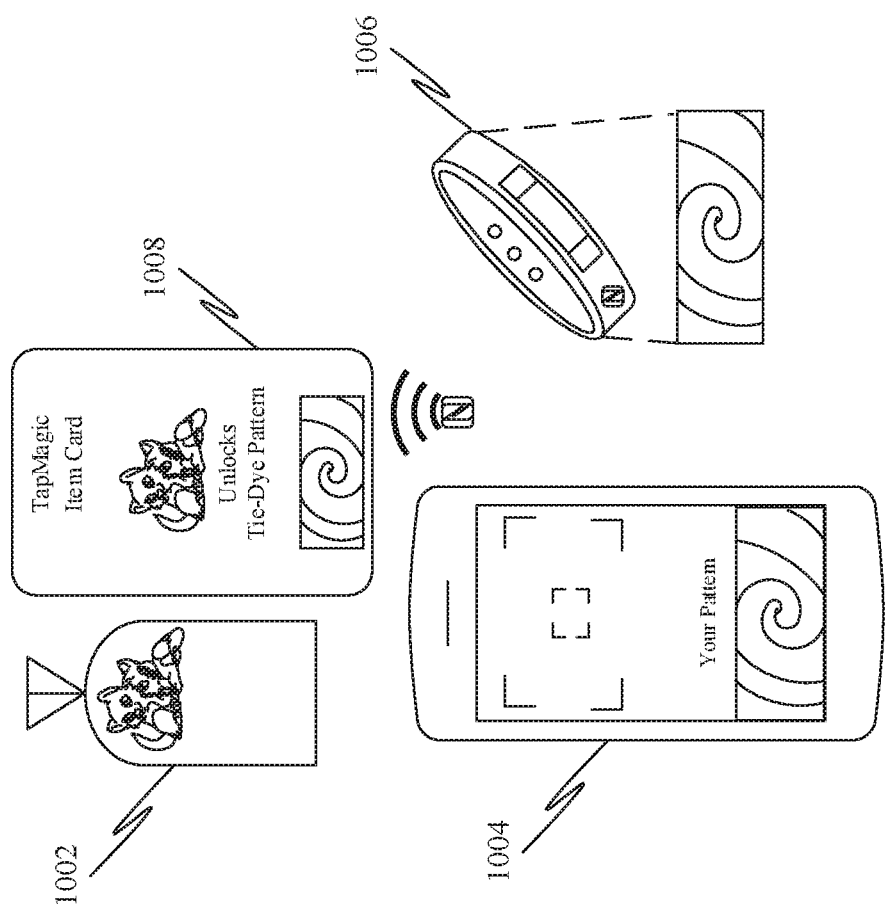
FIG. 10 is a representation of a system for facilitating a proximity based interaction between a first portable electronic device and a second portable electronic device, wherein the second portable electronic device may include an NFC enabled product packaging, in accordance with some embodiments.

Further, in an embodiment, as shown in FIG. 10, the short range communication enabled object may include a product packaging, such as a Hello Kitty® backpack 1002. Further, the predetermined action may comprise a transmission of the second digital asset, such as a special pattern, DIY creative element, or promotion, of the Hello Kitty® backpack 1002 to the portable electronic device, such as a mobile device 1004, or a wearable device 1006. Further, the second digital asset may be transmitted to a second short range communication enabled object, such as an NFC enabled trading card 1008.

According to some embodiments, a parallelized social network processing based on real-time user behavior and real-world interaction is disclosed.

Further according to some embodiments, a system for forming a virtual social mesh network based on social connectivity is disclosed. The system may comprise a mesh graph driven by establishing social connections as well as perspective individuals with shared interests.

Further, social mesh of interconnectivity may be established between devices based on a social connectivity of a user with a plurality of users of other devices. Further, the social mesh of interconnectivity may be established between one or more wearable devices based on a social connectivity corresponding to a plurality of users. In an instance, the one or more wearable devices may be called as Dotifi devices.

A social connection may be established by mutual friends who may have invited and accepted invitations may become friends, and individuals that may not be connected as friends but whose social profiles may share one or more of common shared interests or experiences.

Further, the social mesh may overlay a geographical component highlighting a location of the one or more users, such as from a user device, such as a wearable or may be obfuscated to a home or default location. Further, the one or more users may also enable or disable visibility to other users or may share an interest or prospects to other users. Thus, it may be possible to see users that may be interconnected through intermediaries.

Further, the social mesh may allow users to send real-time social interaction notifications via the one or more Dotifi devices or a mobile application to access the social network, to one or more users and sub-groups of users. Further, the social interactions may be manifested in real-time on wearable devices of the one or more users.

Further, a profile of a user may also be populated with filtered locations (e.g. Bars, Restaurants, Venues, etc.) or Higher-level aggregations like cities. A Dotifi device of the one or more Dotifi devices, or the mobile application may be enabled/disabled to report information on a category (e.g. restaurants, bars, salons, sports venues, etc.), location hierarchy level (e.g. individual establishment, neighborhood, city, county, or state, etc.), and frequency level (e.g. unique count, high/medium/low frequency, or visited/not visited) which may facilitate intersecting 'shared interests' based on user behavior instead of requiring profile updates, providing additional fodder for social engagement around shared locations visited.

Further, the system may derive potential interests automatically and add the interests to a profile of a user, of may allow the user to accept or reject the interest. For example, if a user visits a ski resort an interest in skiing can be automatically derived for profile updates.

Further, the system may leverage Social Login and consented access to one or more social media platforms associated with a user, such as LinkedIn® and Facebook® profiles to 'seed' profile without having to re-create information interest information that the user may have on the one or more social media platforms.

Further, the social mesh may provide latent social information useful for deriving interesting useful insights for conversation and human connectivity. For example, the social mesh may allow two individuals in a bar to be notified that the individuals may share an interest in scuba-diving, and may have been to Grand Cayman.

Further, location-trail and derived interest may significantly increase information such as location and interest. Further, location-trail and derived-interest information may be more trustworthy/factual due to being driven from actual behavior and location profiles.

Further, according to some embodiments, a method and system for proximity-driven social discovery description is disclosed. The system may provide automatic notification of individuals with shared interest within proximity. For instance, a user may walk into a bar and be notified that 4 sub-divers may be present in the bar.

The system may utilize wearable device proximity detection to notify users of shared interest intersections. When a user is within 150 feet of one or more users with a shared interest, one or more notifications may be automatically sent to a Dotifi device of the user, which may be expanded upon user input. Additional information may be provided for one or more friends of the user.

If a user is a Share-Interest user (the user may share one or more interests), then basic information may be provided based on profile options (e.g. First Name, Gender, Hair Color, etc.). Further, if a user is in anonymous mode, then a notification including an acknowledgement ability to tap again to transmit an LED Pattern or vibration upon acknowledgement may be transmitted to a user device of the user. Further, the system may include algorithms that may derive shared interest profile intersections in real-time as well as in offline mode. Further, the system may include wearable firmware or mobile software capability to report geolocation via one or more sensors such as GPS or Bluetooth to a cloud-based network, such as the online platform 1500 for interesting location trail with points of interest.

Wearable firmware algorithm that report a proximity detection to the Dotifi service and the Real-time Dotifi algorithms to: maintain the state of devices in proximity with each other, determine shared-interest intersections of the new device within proximity other those devices, and dispatch notifications/updates to all relevant devices/device owners with the social engagement information. Further, the system may provide social discovery in an automatic and easy manner that may lead to conversation and engagement. Further, the system may not require social dis-engagement and a distraction of looking at a phone and lighting up a dark venue with the light from its display.

Further, according to some embodiments, a system for visualizing a virtual mesh network description is disclosed. The capability to visually display interconnectivity/mesh amongst users based on social parameters as well as show the mesh amongst close proximity users (within Bluetooth range of 150 feet) and how that mesh extends to others virtually across the country or global.

The visualization may provide an ability to filter based on an event or other filters. For example, a user watching New Year's Ball Drop in Times Square from home in Chicago may see a mesh of Time Square users with Dotifi devices as well as who and how those users may be connected.

The visualization may show and update varying thicknesses of lines (number of connections) and a size of circles (user or user aggregation). The casualization may be readily available for individual consumption or for display via broadcast media. In an embodiment, lines and circles may be replaced by other visualizations.

The visualization may also display varying intensities based on behaviors such as pumping fists or cheering allowing individuals and event coordinators to see and react to activities in real-time. For instance, based on activities, a visualization may describe that the state of Chicago may be atop a leader board for energy level.

Further, in an embodiment, the system may be configured to display of interaction codes to increase remote engagement in social events. For instance, QR codes may be displayed from broadcast media so one or more users may scan the QR codes, such as using one or more user devices to register a thumb up which may be reflected in a display. Further, in an embodiment, promotion codes may also be displayed corresponding to one or more discounts. Further, the system Further, the system may visually engage and reward typically passive remote event participants (e.g. TV event viewers) so that the participants may feel a part of the event.

Further, the system may visually "connect" a user to an event and one or more individuals connected to the event. Further, a user John Doe may be interviewed in Time Square and may be connected to viewers (or places) across country. Further, one or more may increase in intensity as one or more users associated with John Doe, such as friends and family may cheer him on.

Further, according to some embodiments, a system for managing and interacting with a social mesh network is disclosed. This system may entail mechanisms for managing what could be a prohibitively large social mesh networks generating tens to hundreds of thousands of events per second. The system may provide an ability to slice the active social mesh based on various dimensions for visualization, social discovery and aggregate, social feedback, and advertisements, and promotion targeting.

Further, the system may entail maintaining social mesh structure via a stateful streaming data algorithm running on a distributed computing platform.

Further, the system may execute an algorithm that may maintain a set of adjustable device states and state machines related to active Social Mesh graphs. Further, a device state may include current state, last known state, cluster connected to, array of device events, current state age, and social connection array. Further, Network/Cluster State may include social mesh graph (nodes social linkage), and number of connections. Further, device/owner profile intersections may include interest items intersecting with profile updates.

Further, promotion profile and state may include promotion profile parameters (e.g. offers, promotion thresholds), and promotion target parameters. Further, the promotion profile and state may include processing of new or changed promotion events in real-time. Further, social slice control stream may include monitoring a control stream that may configure social segment states and formulation or teardown of segments based on intersects. Further, social slice output/visualization state may include visualization-optimized data output. Further, event stream may include social mesh device events including but not limited to device join/dormant/departure, device sensor events, algorithms for real-time cleansing and geo-mapping location trails to maps and determining point of interest intersects, and algorithms for processing POI intersects to shared interest profile updates. This process may broadcast update to a pub/sub mechanism that both a database (such as databases 1508 as shown in FIG. 15), in an instance known as Dotifi database, as well as social mesh processes/algorithms are listening to for updates.

Further, the system may process extremely large, dynamic social mesh graphs in real-time.

Further, the system may target and deliver visual codes to, and process responses (e.g. code recognition with phone or device, detecting and linking user behavior to presentation of promotions, etc.) in real-time.

Further, the system may show on-demand effects in sub-second or with minimal latency from the time of command.

Further, the system may handle thousands and potentially millions of data points per second to gauge mesh changes, participant behaviors, and promotional overlay in real-time.

Further, the system may effectively deliver key state information and updates on a real-time basis for Effective visualization and management.

According to some embodiments, a method and system for digital unboxing, sharing, and management of digital content and collectibles is disclosed. Further, the system may be a simplified system for revealing device-based, personal, digital content based on physical proximity and/or interaction with other devices or tags, and storing and managing digital collectibles. Further, a device may include a wristband, watch, phone, tablet, any other programmable electronic device, or, any other device like a figurine, book, trading card or poster may encompass an RFID-type tag. Further, an object may include an NFC tag, an unpowered object, specially coded object, or a device emulating a tag. Further, an event mode may include a firmware state within which two or more proximal devices may interact in real-time to provide a group shared experience and content reveals (unboxing). Further, an unconnected device may correspond to one or more electronic devices that may not require an internet, Wi-Fi, mobile phone/device, or type of data communications connect in order to operate and deliver a user experience. Further, content may embody characters, images, facts, mystery reveals, accessories, badge counters, GIFs or other short animations, virtual room or any other acquisition of items. Further, NFC and NFMI may be utilized as a close-proximity-based communication mechanism. Further, NFC may be used henceforth for brevity. Further, BLE may refer to Bluetooth Low Energy. Further, a tap may correspond to a device physically touching or coming within an allowable range of an NFC range of a second device or object.

Further, the system may facilitate digital unboxing, collection, and sharing through social interaction with only a tap through a technical and gesture-based ecosystem. Further, the system may facilitate gamification, device interactions, such as with one or more Virtual Reality (VR) devices.

Further, according to some embodiments, a system to facilitate revealing of pre-loaded associated with unconnected devices. Further, in an embodiment, the system may be called as "Collectif-i" or "Collect-i-dek" system.

Figure 11:
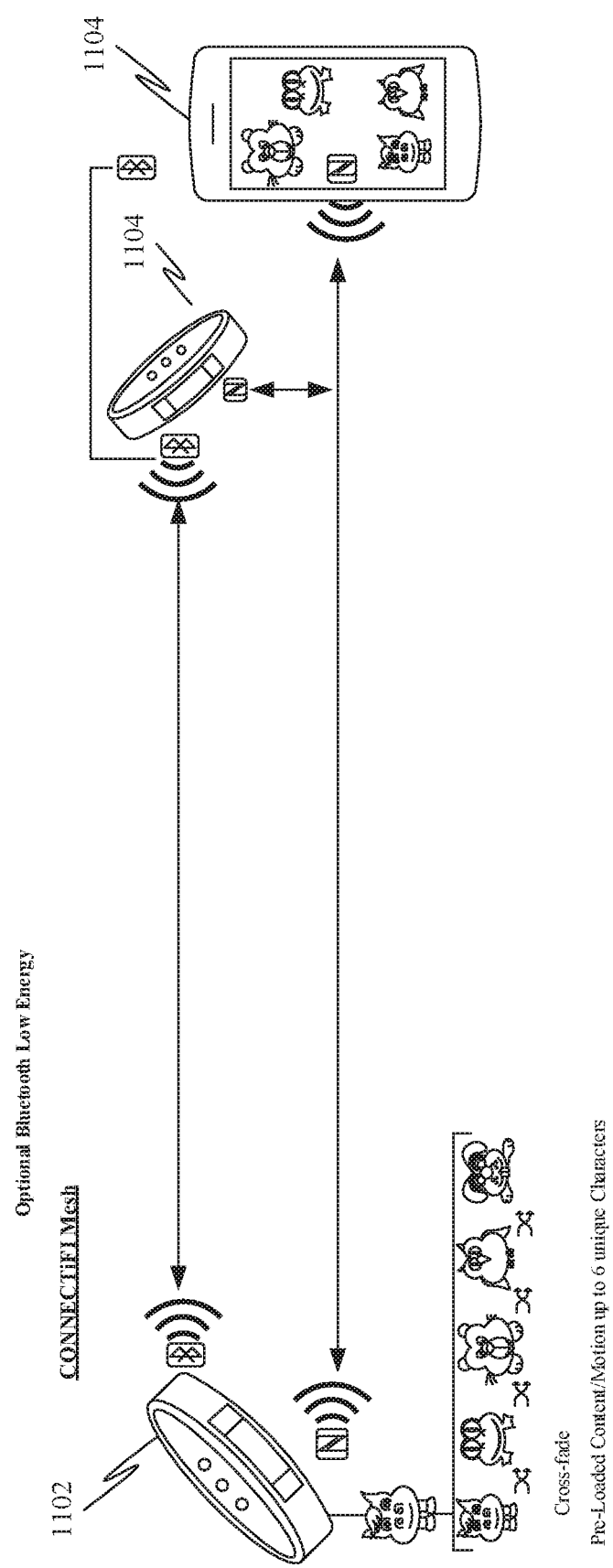
FIG. 11 is a representation of an exemplary system for facilitating a proximity based interaction with a short range communication enabled object, in accordance with some embodiments.

Further, the system may include a device with both Bluetooth and NFC transceiver functionality and firmware to support communication with one or more devices, or objects, and for and content/state sharing. Further, the device may be configured for communicating and sharing content, or state without internet, Wifi, mobile data connection or any type of centralized data connection or proxy (e.g. mobile phone connectivity). Further, in an embodiment, the device may be configured for communicating and sharing content, or state over a communication network including internet, Wifi, mobile data connection or any type of centralized data connection or proxy (e.g. mobile phone connectivity). Further, a user may tap the device to a second device or object to reveal digital content associated with the device, or to share the digital content with the second device or object. For instance, the user may tap the device to the second device, or object, or one or more devices and objects in different combinations to share the digital content. As part of the system, one or more unconnected devices, such as wearable wristbands may be obtained (such as purchased) with pre-loaded content to be 'revealed' in various ways. For instance, a wearable wristband 1102 (as shown in FIG. 11) may comprise 6 characters that may be unknown at a time of purchase. Further, once the wearable wristband 1102 is turned on, one or more characters may be revealed, or may be revealed upon interaction, such as a tap with one or more devices, such as a smartphone 1104, or objects, such as a second wristband 1106. Further, in an embodiment, the wearable wristband 1102 may comprise a Collect-i-dek digital album. Further, a firmware of the device (such as the wearable wristband 1102), may read the one or more objects and may be configured to react an object ID corresponding to the one or more objects. Further, the device may process a proprietary data payload of the one or more objects. For example, the firmware may be configured for loading and displaying content within the one or more objects. Further, the firmware may identify an id as a device, and may be configured to automatically trigger application features and allow content sharing. Further, the system may facilitate unique digital reveals and surprises on unconnected devices and through peer-to-peer interaction. For example, a birthday party pack of 15 bands may include 15 unique reveals without parental Wi-Fi/internet set-up, immediate reveal of characters by simply tapping if needed, and no physical product to carry around, avoid losing afterwards or physical product that eventually become a waste to landfill problem.

Further, according to some embodiments, a system to facilitate parameter-driven or event-driven configuration for digital reveals is disclosed. Further, the system may facilitate revealing of characters or other digital content with a device based upon parameter-based or event-based configurations.

For example, if a device comprises 6, pre-loaded characters, one or more may be revealed immediately upon turning on the device. Further, one or more characters may be revealed based on other on-interactive parameters, such as one character reveal each day. Further, one or more characters may be revealed based one or more parameters, such as on sensing that the user may have walked 10,000 steps in a day, or may have tapped 2 other devices or objects.

In an embodiment, the user may purchase a Collectif-i band that may comprise 6 digital characters of which 5 may be revealed once-a-day. The sixth character may be revealed if the user purchases a Collect-i-dek digital album that the user may need to tap. Further, the system may facilitate collectible, and tradeable digital reveals as part of an initial purchase. Further, unboxing and reveals may be based on interacting with other unconnected devices in a true peer-to-peer fashion. Further, the system may facilitate rich (robust) unboxing and reveal/surprise experiences and rewards that may go beyond one-time, physical unboxing and may not be socially-isolated, and may be interactive.

Further, according to some embodiments, a proximity based system to with tap-managed content and collectible sharing & notifications is disclosed.

Further, a method for sharing and finding collectibles with a tap and proximal awareness—without a primary need to navigate a mobile phone application/website nor have a connected device (e.g. unconnected device) is disclosed.

A firmware may allow one or more users to "tap" NFC-embedded objects or devices to share or trade collectible characters and digital content with others. Two device owners may share content by simply tapping devices and the content may be shared or traded. If the device is a digital album (determined based on the firmware interaction and device id) the content may be stored or retrieved. In an embodiment the objects may include wristbands that may be tapped in a peer-to-peer context to share content, such as one or more characters.

In an embodiment, the shared content may comprise an associated 'half-life' after which the content may start to disappear. Further, the system may allow collectables to be shared on a permanent or non-permanent basis. Further, traded characters/content may be permanent and may be fully instantiated within the system. A shared character may allow a user to experience the characters or content on a 'trial' (aka temporary) basis and perhaps with certain configured limitations. For example, a shared character may be fully experience as part of a collection but that character may have a 1-week life during which the character may slowly begin to fade until deletion or inactivation, leading to visibility as a non-functioning silhouette. However, a shared character's configuration may allow the character to "live" indefinitely if the user has a Collect-i-Dek digital album or if there are other parameters in place to which the character may be tapped or saved permanently. Further, an inactive shared character may be revived as either a shared character (thus restarting the 1 week/configured half-life) or a permanent character if the character is revised via a tapping with a revival character/function (such as corresponding to a band or other purchased item). Further, any accessories and stats that the shared character may have amassed in "Shared" state may be retained or revived.

Further, the system may a user to be notified on a device, if there are one or more users within a predefined proximity of who may possess a character, accessory, or other items that the user may desire. Further, the user may touch or utilize a gesture controlled activation related to the notification to begin a near-proximity introduction to the one or more users and an interaction may lead to a simple share or trade. Further, the user may create a list of specific characters or content or hashtags that the user may desire. Further, a device of the user may broadcast the list to one or more devices in proximity which may respond with any content that the user may require. Further, in an embodiment, the device may generate an alert of content that the user may not have. For example, one or more devices may broadcast to the device any extra characters and shareable content that may be available. Accordingly, the user may not need to specify long lists of uncollected characters in order to received notifications.

Further, a notification may include a display visual notification (lighted border flash) as well as a momentary small message or image subset of detected characters. For example, a notification may describe top 3 characters that one or more users near the user may possess.

Further, a notification may describe that one or more devices may include one or more characters that may complete a collection of the user. The user may touch the notification which displays a visual pattern or description allowing for the user to communicate with the one or more devices.

Further, the system may combine elements of unboxing mystery digital content on unconnected devices, and may add elements like digital collecting, sharing, and trading.

Further, the system may allow digital reveals and surprises on unconnected devices and through peer-to-peer interaction Further, the system may allow characters and content to be revealed and transferred to a device from one or more devices or unpowered NFC tags.

Further, in some embodiments, a Domain Specific Language (DSL) for tap-managed content is disclosed. The system may provide a proprietary Domain Specific Language (DSL) for content encoding, compression, description and data/interaction management which that also serves as bridge that may transcend historically separated technology systems such as like iOS® and Android®, and various proprietary devices. A wristband may be taped to transfer characters or content from other bands, iWatches® to Android® smartphones, iPhones®, tablets, and so on through a tap.

The system may consist of firmware that may be embedded within devices and software/Software SDK within mobile applications that may leverage NFC and Bluetooth as a data connection transport to communicate and interpret a common DSL. The system may also provide for modifying the DSL payload as a mechanism to manage tap interactions. For example, increasing a Tap counter that can then may be interpreted by subsequently tapped devices to determine if a character or content may be shared or traded any further.

Figure 12:
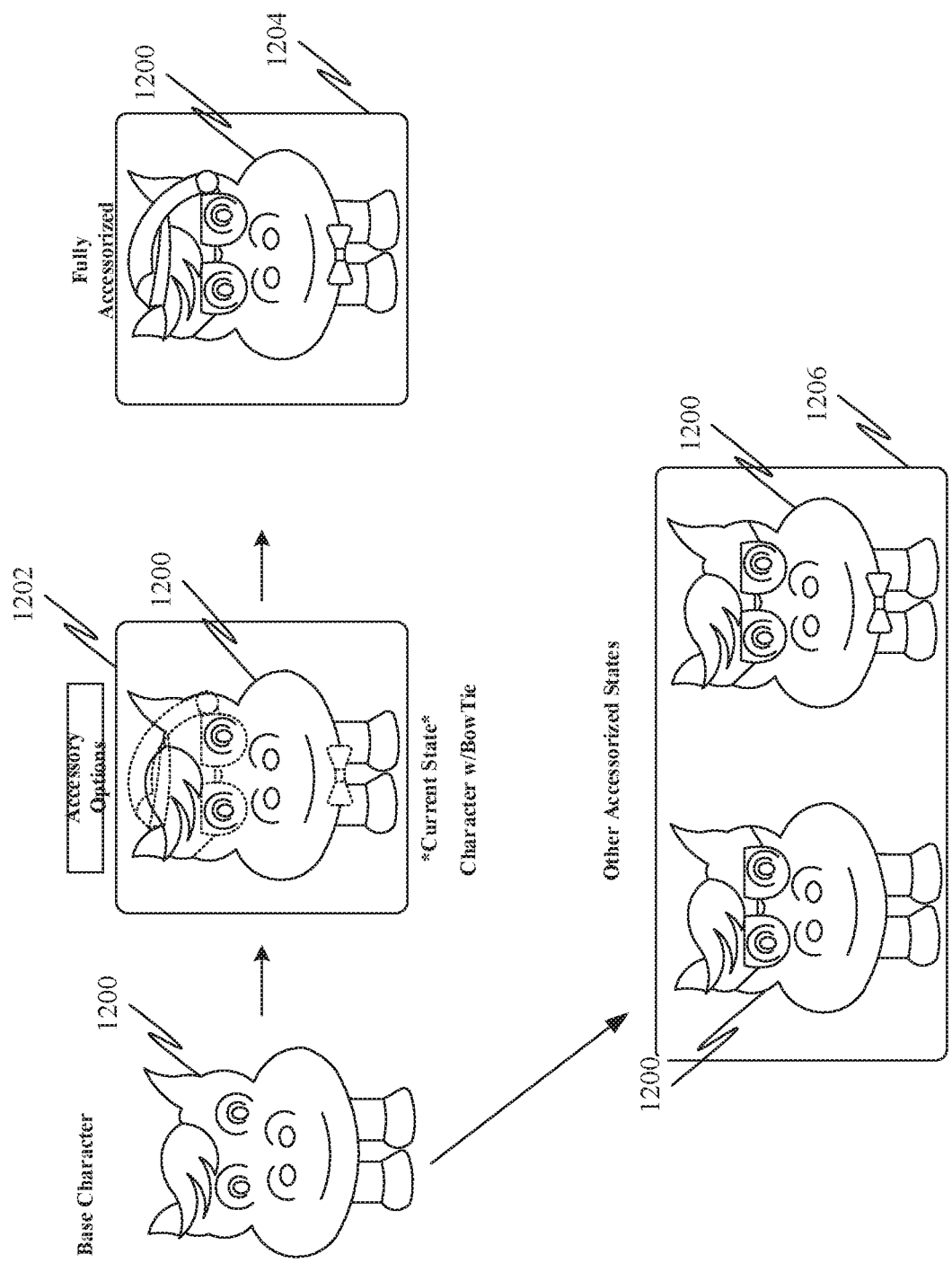
FIG. 12 is a representation of a character with a plurality of accessories, in accordance with some embodiments.

FIG. 12 is a representation of a character 1200 with a plurality of accessories, in accordance with some embodiments. 1202 is a view with accessory options. Further, 1204 is a view with a plurality of accessories collected by the character 1200. Further, 1206 is a view with accessory options.

The DSL may provide a ParticleType and DSLType designator which may willow for an ability to search within content of a character for abilities and actions to provide for stateless and distributed interaction and content as part of a social blockchain interaction. For example, a virtual room may be created and shared with one or more users, and capabilities and actions of the virtual room may be defined.

Further, according to some embodiments, an exemplary DSL for virtual room and unboxing animation is described as below.

Further, the system may comprise a simple, hands-free mechanism to exchange content/characters across one or more devices within an application context. The content may be immediately reflected within an application experience that may fulfill an objective of a user (i.e. see character displayed within a collection), and may not require an established data network, hands-on data transfer set-up, manipulation, or post-transfer manipulation.

Further, in accordance with some embodiments, a digital content storage, and customization system, including digital albums is disclosed.

The system may allow for a user device, such as a smartphone, or a tablet to store and manage digital collections. Wearable devices may be limited in storage. The digital album may allow a user to simply tap a device to the user device, such as a tablet to store content to create room to receive additional characters or content without having to lose existing content and characters. The digital album may hold a plurality of characters and content compared. Further, a larger display device of a tablet or smartphone may allow for sharing of broader statistics and content information, and may display an entire portfolio of Characters, along with a progress towards completing a collection.

Additionally, the digital album may allow the user to select one or more characters to be sent to a device with a tap allowing for very simple wearable device customization. For example, the user may feel like showing a rare set of 15 characters or related fashionable content as opposed to a theme of character. Further, the digital album may also allow to the play pattern of keeping shared characters that would otherwise, based on their configuration, disappear after a period of time.

In an embodiment, a user may purchase a Digital Album (ie. Collectif-i-dek) to which the user may periodically a device to store Characters and view overall collection and collectible progress. The User may select themes of characters/content from the digital album that the user may wish to display on the device through customized playlists.

According to some embodiments, a method and system for creating ad-hoc shared virtual experiences is disclosed. Further, the system may comprise a hands-free mechanism for forming and participating in peer-to-peer, mesh digital experiences.

Further, the system may provide a simple and secure way for multiple users to enter virtual rooms or shared experiences using one or more devices without the need for an internet or Wi-Fi network connection.

Further, according to some embodiments, a system for hands-free initiation of shared group digital experiences is disclosed.

Further, the system may include devices with NFC and Bluetooth Low Energy and/or Bluetooth Mesh capability. Further, the system may include utilizing NFC communications to establish a private secure Bluetooth network as well as application-level group initialization (i.e., initial authentication/authorization of the device, protocol for determining the master device for a virtual group experience, etc.). After the Bluetooth network may be initialized, group firmware/software communications may occur over the Bluetooth network.

First, a first user may put a first device into a master "Friend" mode where the first device may be the designator and arbitrator of shared assets—for example the type of virtual room within one or more characters representing other users may appear. In an embodiment, the first user may not put the first device into master "Friend" mode. Further, firmware may establish a master arbitrator amongst the first user and a second user to tap and initialize the group. Firmware on the first device, and a second device may exchange key and information regarding initializing a Bluetooth network. An initialization vector may be exchanged for provisioning a secure Bluetooth mesh or BLE connection as well as determining which device may be the master arbitrator at a firmware application level. At a firmware application level, each device that joins the group may be also be provided a group state, including and not limited to virtual room assets and virtual room state (e.g., the characters populating the room and their state). Each device that joins the group may see a 'live' view of the room and each group members character within it. Further, a count-down timer may on each device showing a time remaining for any additional user to join the group. Any group devices may 'Tap' a non-group device the device to receive the initialization vector and join the group. Every time a non-group band may join the group, the countdown timer may reset to restart the counter sequence, at which time the timer may be reset through a mesh broadcast on all devices, or the timer may continue uninterrupted. Once the timer expires no additional device may join the group. Further, the group master may be virtually changed by taping another device of the group, at which point the tapped device may be updated as the master, keep group state, and the change broadcast to the group.

Further, a group initiation could also be started by tapping an NFC Tag especially encoded with parameters for a network like network group address and a well-known address for a storing group state (i.e. master device, etc.). Further, the group may be disbanded once the master device exits from the group.

Further, a group initiation could also be started by tapping an NFC Tag especially encoded with parameters for a network like network group address and a well-known address for a storing group state (i.e. master device, etc.) whereby one or more devices may, upon tapping the NFC Tag, the one or more devices may see a live view of a different virtual room.

Figure 13:
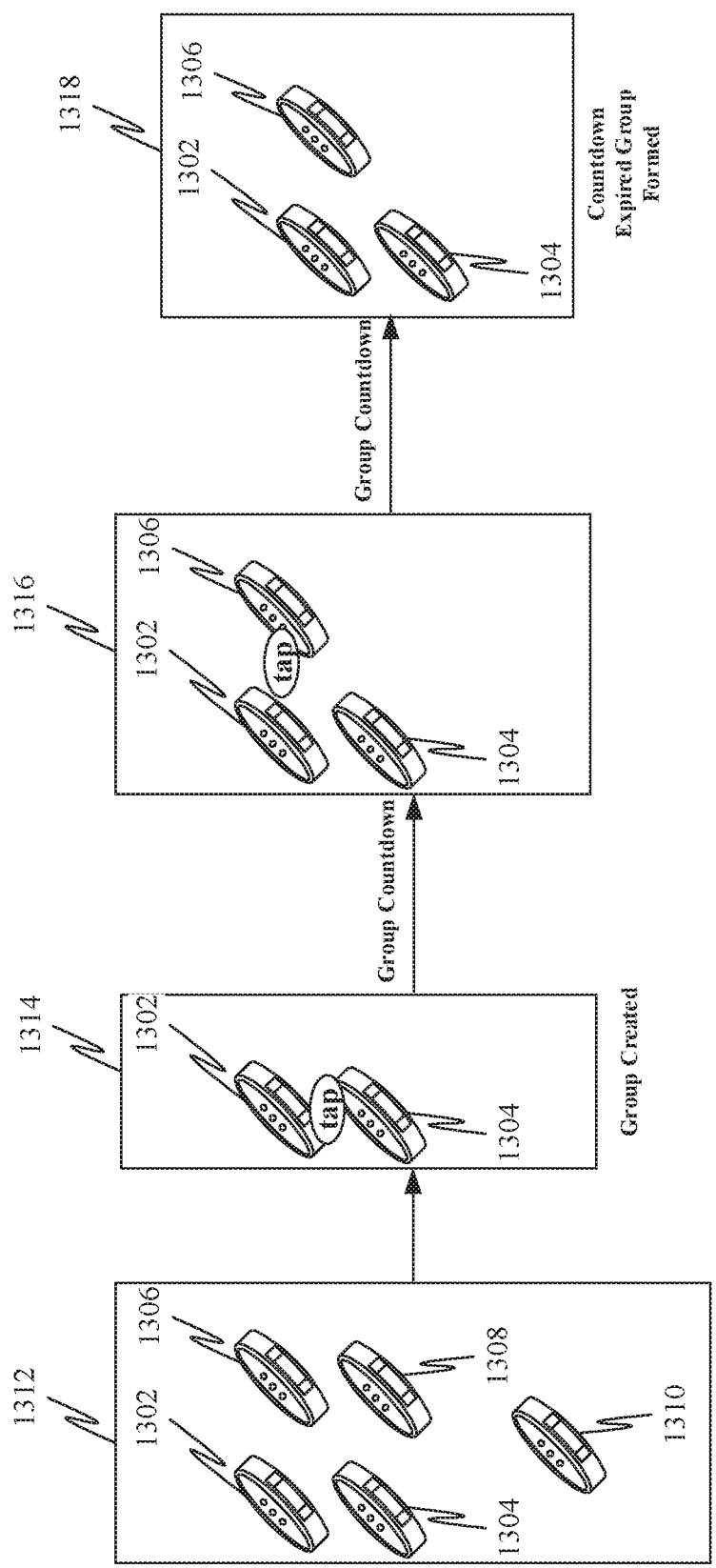
FIG. 13 is a representation of creation of a group, in accordance with some embodiments.

FIG. 13 is a representation of creation of a group, in accordance with some embodiments. At step 1312, five individual users represented by five devices, such as a first device 1302, a second device 1304, a third device 1306, a fourth device 1308, and a fifth device 1310 may be available. Further, at step 1314, the first device 1302 and the second device 1304 may initiate a Group session. Further, at step 1316, the third device 1306 may join the group within a predetermined time, such as a 12 second window. Further, at step 1318, the group may become active after the predetermined time including the first device 1302, the second device 1304, and the third device 1306.

Figure 14:
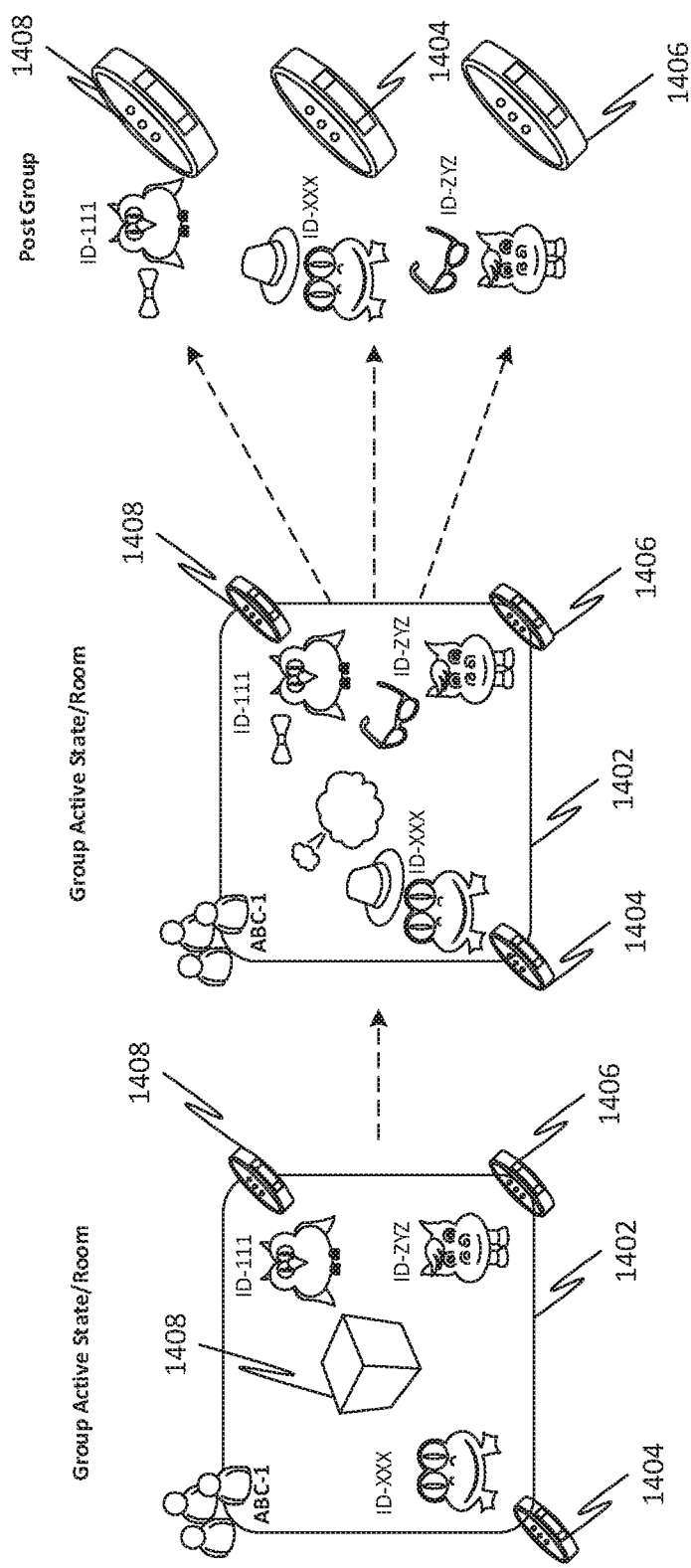
FIG. 14 is a representation of a group experience, in accordance with some embodiments.

According to some embodiments, a system to facilitate participation in and control of shared digital shared experiences, such as via Bluetooth communications—without necessarily using a traditional network/cellular/internet connection or communications is disclosed. Further, as shown in FIG. 14, once a shared experience/group is initiated, a shared virtual room 1402, viewable across all participating devices such as a first device 1404, second device 1406, and a third device 1408, may then start another countdown and/or deliver a mystery box 1410 which may animate and open giving each character within the room a reward, such as an accessory, action, or other digital element. Further, shared group assets, such as the appearing of the mystery box 1410, may be controlled by the master device, such as the first device 1404. Each user in the group may control a character corresponding to the group member within the virtual room. For example, shaking a wearable device, such as the second device 1406 may make a character dance, which may be communicated using a domain specific language (DSL) for controlling and manipulating images and sprites. This DSL may be included in a share state broadcast to group members over the established Bluetooth network. Further, a group member may trigger a wearable device, such as the third device 1408 (such as by pressing a button or executing a gesture) to take a picture (image capture) of the group/virtual room as a keepsake.

Further, group session may either end automatically as determined by the firmware (after rewards are given) or through a trigger by a member of the group as determined by the firmware (such as the master user through a firmware action e.g. a button press, gesture, etc.).

Further, once the session ends, each respective device may provide a 'post-group' view, such as including a character with a new accessory and/or statistics from the group experience, etc.

Further, according to some embodiments, a method and system to provide digital rewards and content in group wearable experiences, without the need for a central authority, nor a needed data connection thereto, to arbitrate the rewards or to maintain persistent state outside of a participating device itself is disclosed. The system and method may provide relevant rewards for each user without the need for a centralized authority or understanding of all potential aspects of group submitted the content. Moreover, the system may allow consideration of elements outside of the specific group experience.

Further, a stateless group experience is facilitated should devices leave a group, and for ensuring an understanding of device state to determine which accessories are valid for each character, such as by considering accessories that the device/character may already possess, etc.

Additionally, since each individual Device calculates outcomes and rewards, the Devices may factor in device elements (i.e., heartbeat, location etc.) that may be to data intensive or personal to broadcast.

FIG. 15 is an illustration of an online platform 1500 consistent with various embodiments of the present disclosure. By way of non-limiting example, the online platform 1500 to facilitate a proximity based interaction between a first portable electronic device and a second portable electronic device may be hosted on a centralized server 1502, such as, for example, a cloud computing service. The centralized server 1502 may communicate with other network entities, such as, for example, a mobile device 1504 (such as a smartphone, a laptop, a tablet computer etc.), other electronic devices 1506 (such as desktop computers, server computers etc.), databases 1508, sensors 1510, and a wearable electronic device 1522 over a communication network 1514, such as, but not limited to, the Internet. Further, users of the online platform 1500 may include relevant parties such as, but not limited to, end users, administrators, service providers, service consumers and so on. Accordingly, in some instances, electronic devices operated by the one or more relevant parties may be in communication with the platform.

A user 1516, such as the one or more relevant parties, may access online platform 1500 through a web based software application or browser. The web based software application may be embodied as, for example, but not be limited to, a website, a web application, a desktop application, and a mobile application compatible with a computing device 1600.

Further, in some embodiments, the online platform 1500 may facilitate proximity based interaction with the first portable electronic device 100, and the second portable electronic device 102. Further, the first portable electronic device 100, and the second portable electronic device 102 may communicate with the online platform 1500 such as to access a market user interface, to craft, and/or alter the first digital asset and the second digital asset, to store the first digital asset and the second digital asset, and to transmit the first digital asset and the second digital asset. Further, in an embodiment, the online platform 1500 may interface with at least one of the first portable electronic device 100, and the second portable electronic device 102 to back up at least one of the first digital asset and the second digital asset, such as on databases 1508.

Figure 16:
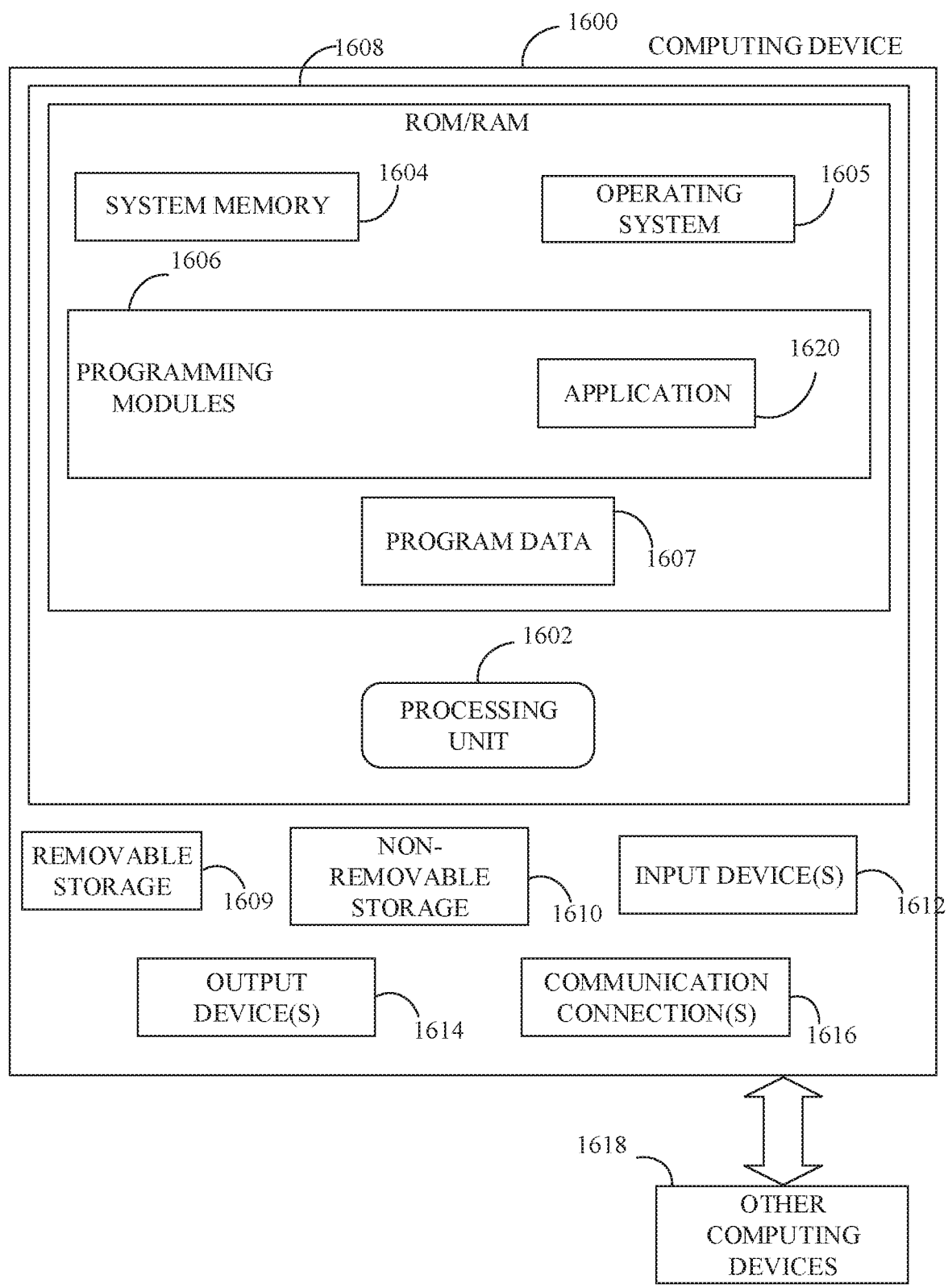
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A first portable electronic device facilitating a proximity based interaction with at least one second portable electronic device, wherein the first portable electronic device comprises:
   at least one first sensor device configured to generate at least one first sensor data;
   a first transceiver configured for communicating with at least one second transceiver associated with the at least one second portable electronic device;
   a first processor communicatively coupled with each of the first transceiver and the at least one first sensor device, wherein the first processor is configured for:
      detecting at least one proximity based event based on the at least one first sensor data from the at least one first sensor device, wherein the at least one proximity based event comprises at least one of identifying a contact between the first portable electronic device and the at least one second portable electronic device, detecting distance between the first portable electronic device and the at least one second portable electronic device, and capturing at least one visual code associated with the at least one second portable electronic device using an image sensor of the first portable electronic device; and
      generating a combined digital asset using a first digital asset and at least one second digital asset based on the detecting, wherein the first digital asset is obtained from a memory device associated with the first portable electronic device, wherein the at least one second digital asset is obtained from the at least one second portable electronic device; and
   the memory device configured for storing the combined digital asset and the first digital asset.

2. The first portable electronic device of claim 1, wherein at least one of the first portable electronic device and the at least one second portable electronic device is a wearable electronic device.

3. The first portable electronic device of claim 1, wherein at least one of the first portable electronic device and the at least one second portable electronic device is a short range communication enabled object.

4. The first portable electronic device of claim 3, wherein the short range communication enabled object comprises at least one of an NFC enabled trading card, an NFC enabled poster, and an NFC enabled product packaging.

5. The first portable electronic device of claim 1, wherein the at least one first sensor device comprises at least one of a radio frequency sensor, an image sensor, a proximity sensor, an audio sensor, a motion sensor, and an accelerometer.

6. The first portable electronic device of claim 1, wherein the first digital asset comprises at least one of at least one first visual characteristic, at least one first audio characteristic, and at least one first haptic characteristic, wherein the at least one second digital asset comprises at least one of at least one second visual characteristic, at least one second audio characteristic, and at least one second haptic characteristic, wherein the at least one first visual characteristic comprises a first color and the at least one second digital visual characteristic comprises a second color.

7. The first portable electronic device of claim 6, wherein the first processor is configured to generate the combined digital asset by combining at least one of the at least one first audio characteristic, and the at least one first haptic characteristic with at least one of the at least one of at least one second visual characteristic, the at least one second audio characteristic, and the at least one second haptic characteristic.

8. The first portable electronic device of claim 1, wherein at least one of the first portable electronic device and the at least one second portable electronic device comprises a presentation device configured to present the combined digital asset.

9. The first portable electronic device of claim 8, wherein the presentation device comprises at least one of a display device, an audio device, and a haptic feedback device.

10. A first portable electronic device facilitating a proximity based interaction with at least one second portable electronic device, wherein the first portable electronic device comprises:
   at least one first sensor device configured to generate at least one first sensor data;
   a first transceiver configured for communicating with at least one second transceiver associated with the at least one second portable electronic device;
   a first processor communicatively coupled with each of the first transceiver and the at least one first sensor device, wherein the first processor is configured for:
      detecting at least one proximity based event based on the at least one first sensor data from the at least one first sensor device, wherein the at least one proximity based event comprises at least one of identifying a contact between the first portable electronic device and the at least one second portable electronic device, detecting distance between the first portable electronic device and the at least one second portable electronic device, and capturing at least one visual code associated with the at least one second portable electronic device using an image sensor of the first portable electronic device; and
      generating a combined digital asset using a first digital asset and at least one second digital asset based on the detecting, wherein the first digital asset is obtained from a memory device associated with the first portable electronic device, wherein the at least one second digital asset is obtained from the at least one second portable electronic device, wherein the combined digital asset is formed by inheriting one or more characteristics associated with each of the first digital asset and the at least one second digital asset; and
   a presentation device configured to present the combined digital asset; and
   the memory device configured for storing the combined digital asset and the first digital asset.

11. The first portable electronic device of claim 10, wherein at least one of the first portable electronic device and the at least one second portable electronic device is a wearable electronic device.

12. The first portable electronic device of claim 10, wherein at least one of the first portable electronic device and the at least one second portable electronic device is a short range communication enabled object.

13. The first portable electronic device of claim 12, wherein the short range communication enabled object comprises at least one of an NFC enabled trading card, an NFC enabled poster, and an NFC enabled product packaging.

14. The first portable electronic device of claim 10, wherein the presentation device comprises at least one of a display device, an audio device, and a haptic feedback device.

* * * * *